(12) United States Patent
Hinchey et al.

(10) Patent No.: US 7,627,538 B2
(45) Date of Patent: Dec. 1, 2009

(54) SWARM AUTONOMIC AGENTS WITH SELF-DESTRUCT CAPABILITY

(75) Inventors: Michael G. Hinchey, Bowie, MD (US); Roy Sterritt, Antrim (IE)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 621 days.

(21) Appl. No.: 11/251,538

(22) Filed: Sep. 29, 2005

(65) Prior Publication Data

US 2006/0122952 A1 Jun. 8, 2006

Related U.S. Application Data

(60) Provisional application No. 60/634,459, filed on Dec. 7, 2004.

(51) Int. Cl.
*G06N 5/00* (2006.01)
(52) U.S. Cl. .......................... 706/13; 706/45
(58) Field of Classification Search .................. 706/14, 706/15, 45, 48, 50, 13; 707/100; 709/200, 709/217, 218, 223, 224; 340/438; 123/436; 701/35
See application file for complete search history.

(56) References Cited

U.S. PATENT DOCUMENTS

| | | | | |
|---|---|---|---|---|
| 4,697,242 | A | | 9/1987 | Holland et al. |
| 4,757,463 | A | * | 7/1988 | Ballou et al. .................. 701/35 |
| 5,732,676 | A | * | 3/1998 | Weisman et al. ............. 123/436 |
| 5,834,234 | A | * | 11/1998 | Gallo ........................ 435/69.1 |
| 5,896,083 | A | * | 4/1999 | Weisman et al. ............. 340/438 |
| 6,055,523 | A | | 4/2000 | Hillis |
| 6,084,541 | A | | 7/2000 | Sayegh |
| 6,560,511 | B1 | | 5/2003 | Yokoo et al. |
| 6,591,165 | B2 | | 7/2003 | Takamura |
| 6,755,077 | B2 | * | 6/2004 | Clingerman et al. ..... 73/114.51 |
| 2002/0161480 | A1 | | 10/2002 | Kakutani et al. |
| 2002/0188859 | A1 | | 12/2002 | Dollens |
| 2003/0142851 | A1 | * | 7/2003 | Brueckner et al. .......... 382/107 |
| 2004/0030451 | A1 | * | 2/2004 | Solomon .................... 700/245 |
| 2004/0044633 | A1 | | 3/2004 | Chen |
| 2004/0143725 | A1 | | 7/2004 | Addison |
| 2004/0153823 | A1 | | 8/2004 | Ansari |
| 2004/0205772 | A1 | | 10/2004 | Uszok et al. |
| 2005/0008071 | A1 | | 1/2005 | Bose et al. |
| 2005/0033794 | A1 | | 2/2005 | Aridor et al. |
| 2005/0065652 | A1 | | 3/2005 | Sakagami et al. |
| 2008/0152640 | A1 | * | 6/2008 | Prehm ..................... 424/130.1 |

FOREIGN PATENT DOCUMENTS

WO WO 98/20418 5/1998

* cited by examiner

*Primary Examiner*—Wilbert L Starks, Jr.
(74) *Attorney, Agent, or Firm*—Heather Goo

(57) ABSTRACT

Systems, methods and apparatus are provided through which in some embodiments an autonomic entity manages a system by generating one or more stay alive signals based on the functioning status and operating state of the system. In some embodiments, an evolvable synthetic neural system is operably coupled to one or more evolvable synthetic neural systems in a hierarchy. The evolvable neural interface receives and generates heartbeat monitor signals and pulse monitor signals that are used to generate a stay alive signal that is used to mange the operations of the synthetic neural system. In another embodiment an asynchronous Alice signal (Autonomic license) requiring valid credentials of an anonymous autonomous agent is initiated. An unsatisfactory Alice exchange may lead to self-destruction of the anonymous autonomous agent for self-protection.

4 Claims, 18 Drawing Sheets

SWARM AUTONOMIC AGENTS WITH SELF-DESTRUCT CAPABILITY

This application claims benefit of provisional application 60/634,459 filed Dec. 7, 2004.

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates generally to artificial intelligence and, more particularly, to architecture for collective interactions between autonomous entities.

BACKGROUND OF THE INVENTION

A synthetic neural system is an information processing paradigm that is inspired by the way biological nervous systems, such as the brain, process information. Biological systems inspire system design in many other ways—reflex reaction and health signs, nature inspire systems (NIS)—hive and swarm behavior, fire flies, etcetera, for example. These synthetic systems provide an autonomic computing entity that can be arranged to manage complexity, continuously self-adjust, adjust to unpredictable conditions, and prevent and recover from failures.

A key element of synthetic neural systems is the general architecture of the synthetic neural system. A synthetic neural system is composed of a large number of highly interconnected processing autonomic elements that are analogous to neurons in a brain working in parallel to solve specific problems. Unlike general purpose brains, a synthetic neural system is typically configured for a specific application and sometimes for a limited duration.

Synthetic neural systems derive meaning from complicated or imprecise data and are used to extract patterns and detect trends that are too complex to be noticed by either humans or other computer techniques. A trained synthetic neural system can be thought of as an "expert" in the category of information it has been given to analyze. This expert can then be used to provide projections given new situations of interest and answer "what if" questions. Synthetic neural systems, like people, learn by example. Such systems are adapted, changed and reconfigured through a learning process in which results are compared to goals and objectives, and changes are made to the synthetic neural system to conform future results to the goals and objectives. Moreover, learning in both biological systems and synthetic neural systems involves adjustments to connections between the neurons.

With these advances, autonomic entities have been introduced in which software is implemented to aid in the management and maintenance of computer systems, computer programs, and devices, and when combined with other autonomous entities forms a team focused on completing an objective. To accomplish these goals autonomous entities are empowered with tools that can provide self-fixing and self-healing of autonomic components. Currently, autonomous processes may be used to handle failures on computer systems, manage network traffic, optimize manufacturing processes, manage entertainment services, and explore space. These autonomous processes are also referred to as agents. For example, if a process on a computer system fails to execute, the program may be repaired or simply restarted by an autonomic agent. In some cases, the problem is with the autonomic entity itself and the error, when known, may be due to a defective process or physical device. When the autonomous entity encounters an internal error or failure it is expected to manage the failure by either self adjusting or by self healing. A failure to correct can lead to endangerment of the overall mission, causing damage to other autonomous entities, or wasting resources by allowing non-approved entities to gain access to resources and assets.

For the reasons stated above, and for other reasons stated below which will become apparent to those skilled in the art upon reading and understanding the present specification, there is a need in the art for the management of autonomous entities that can be functionally extracted from the environment upon the occurrence of a predetermined condition. There is also a need for an autonomous entity that adapts itself to changing external requirements. There is a further need for an autonomous entity that performs significant tasks with complete autonomy.

SUMMARY OF THE INVENTION

The above-mentioned shortcomings, disadvantages and problems are addressed herein, which will be understood by reading and studying the following specification.

In one aspect of the present invention, a method is disclosed for managing a system from the received functioning status and operating state of the system. The operating status of the system may be given by one or more of the following indicators: urgency signal, reflex signal, environmental condition, an event condition such as incorrect operation, emergent behavior, failure to perform, and likelihood of jeopardizing completion of the main objective. The operating status and operating condition in this case can be used to generate a stay-alive signal to the system. Such a signal may cause the system to either stay alive, initiate self destruct, or withdraw the stay-alive signal. This aspect addresses the need in the art for the management of autonomous entities that can be functionally extracted from the environment upon the occurrence of a predetermined condition, the need in the art for a synthetic autonomous entity that adapts itself to changing external requirements, and the need in the art for an autonomous entity that performs significant tasks with complete autonomy.

In another aspect, an autonomous system may comprise a plurality of autonomic agents performing a desired task, a messenger autonomic agent, and a coordinating autonomic agent that generates a stay alive signal to one or more of the plurality of autonomic agents based on signals received through the messenger autonomic agent.

In yet another aspect, an autonomous nanotechnology swarm may comprise a plurality of workers composed of self-similar autonomic components that are arranged to perform individual tasks in furtherance of a desired objective.

In still yet another aspect, a process to construct an environment to satisfy increasingly demanding external requirements may include instantiating an embryonic evolvable neural interface and evolving the embryonic evolvable neural interface towards complex complete connectivity. The evolvable neural interface receives and may be capable of generating heart beat and pulse monitor signals, as well as command signals.

In yet another aspect, a computer system may be provided for protecting an autonomic system when encountering one or more anonymous autonomic agents, and the system may include a processor, a storage device coupled to the processor, and software operative on the processor for performing the function of: (i) sending an Alice signal to the anonymous autonomic agent; (ii) monitoring the response of the anonymous autonomic agent to the Alice signal; and (iii) determining the anonymous autonomic agent potential for causing harm to the autonomic system.

Systems, clients, servers, methods, and computer-readable media of varying scope may also be described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into six sections. In the first section, a system level overview of an embodiment is described. In the second section, embodiments of apparatus are described. In the third section, embodiments of methods are described. In the fourth section, hardware and the operating environments in conjunction with which embodiments may be practiced are described. In the fifth section, particular implementations of embodiments are described. Finally, in the sixth section, a conclusion of the detailed description is provided.

System Level Overview

Figure 1:
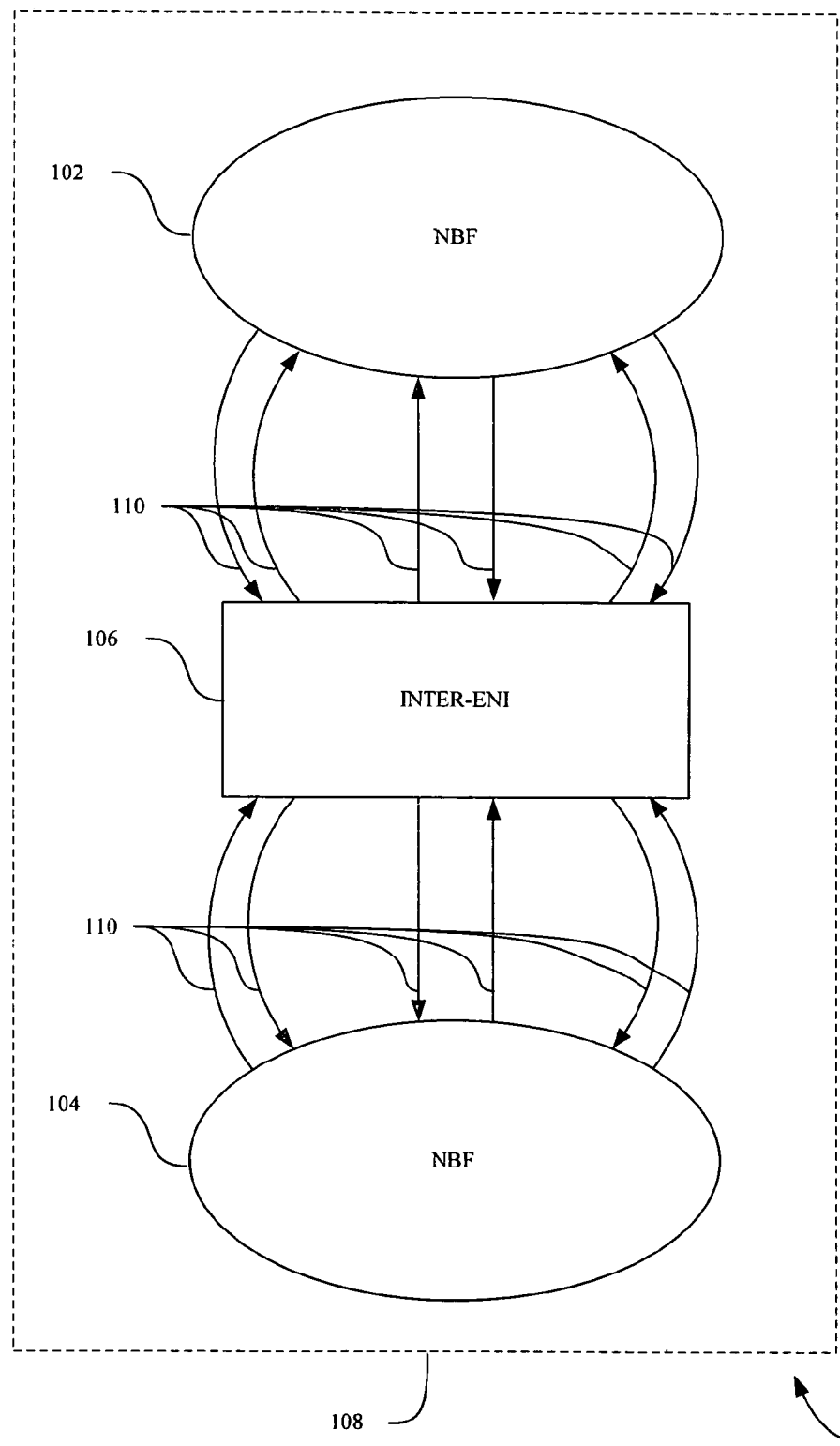
FIG. 1 is a block diagram that provides an overview of an embodiment of an evolvable synthetic neural system to manage collective interactions between autonomous entities.

FIG. 1 is a block diagram that provides one embodiment of an overview of an evolvable synthetic neural system 100 to manage collective interactions between autonomous entities. An embodiment of the system 100 includes a first plurality of neural basis functions (NBFs) 102 and 104. NBFs are the fundamental building block of system 100. In some embodiments of system 100, the plurality of NBFs includes more than the two NBFs 102 and 104 shown in FIG. 1. In some embodiments, system 100 includes only one NBF. One embodiment of a NBF is described below with reference to FIG. 2.

System 100 may also include a first inter-evolvable neural interface (ENI) 106 that might be operably coupled to each of the first plurality of neural basis functions. The NBFs 102 and 104 may be highly integrated, and coupling between the NBFs through the ENI 106 may provide a three dimensional complexity. Thus, when system 100 is implemented on microprocessors such as microprocessor 904 described below with reference to FIG. 9, system 100 may provide a synthetic neural system that reconciles the two dimensional nature of microprocessor technologies to the three dimensional nature of biological neural systems.

This embodiment of the inter-ENI 106 may be known as an inter-NBF ENI because the inter-ENI 106 is between or among the NBFs 102 and 104 at the same level within a hierarchy. The embodiment of system 100 illustrated in FIG. 1 shows only one level 108 of a hierarchy.

System 100 may also operate autonomously. According to an embodiment, a system operates autonomously when it exhibits the properties of being self-managing and self-governing, often termed autonomic, pervasive, sustainable, ubiquitous, biologically inspired, organic or similar. ENI 106 may adapt system 100 by instantiating new NBFs and ENIs and establishing operable communication paths 110 to the new NBFs and the ENIs to system 100. ENI 106 may also adapt system 100 by removing or disabling the operable communication paths 110 to the new NBFs and ENIs. The adapting, establishing, removing and disabling of the communication paths 110 is preferably performed autonomously. Thus, system 100 might satisfy the need for a synthetic neural system that performs significant tasks with complete autonomy.

System 100 may be capable of establishing and removing links to other similarly configured systems (not shown). Thus the system 100 could be self-similar.

The system level overview of the operation of an embodiment is described in this section of the detailed description.

Figure 9:
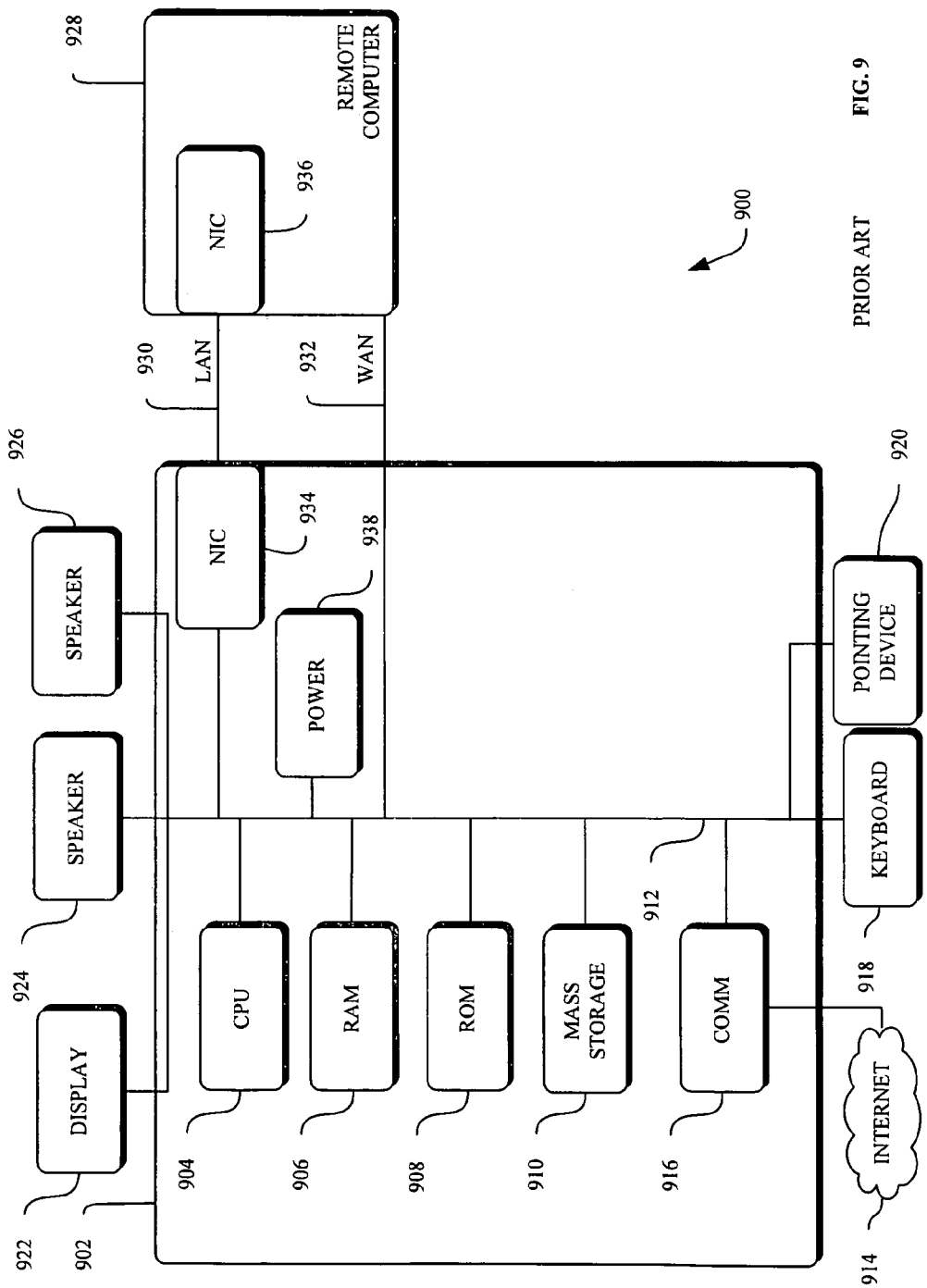
FIG. 9 is a block diagram of a conventional hardware and operating environment in which different embodiments can be practiced.

Some embodiments may operate in a multi-processing, multi-threaded operating environment on a computer, such as computer 902 in FIG. 9.

While the system 100 is not limited to any particular NBF or ENI, for sake of clarity simplified NBFs and a simplified ENI are described.

Apparatus Embodiments

In the previous section, a system level overview of the operation of an embodiment is described. In this section, particular apparatus of such embodiments are described by reference to a series of block diagrams. Describing the apparatus by reference to block diagrams enables one skilled in the art to develop programs, firmware, or hardware, including such instructions to implement the apparatus on suitable computers, and executing the instructions from computer-readable media.

In some embodiments, apparatus 200-600 may be implemented by a program executing on, or performed by firmware or hardware that is a part of a computer, such as computer 902 in FIG. 9.

Figure 2:
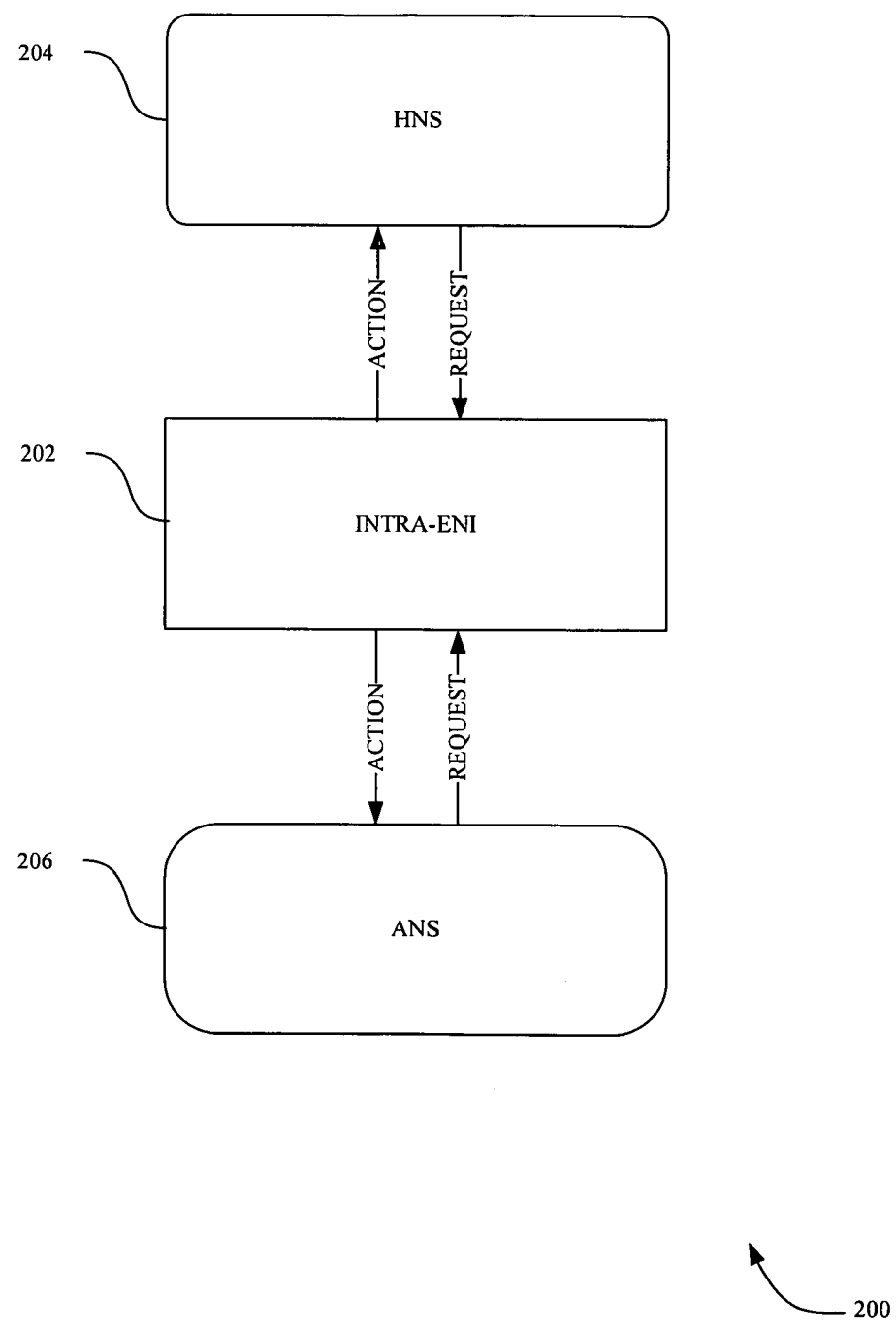
FIG. 2 is a block diagram of a neural basis function of a worker, according to an embodiment.

FIG. 2 is a block diagram of a preferred neural basis function (NBF) 200 of a worker according to an embodiment. NBF 200 is illustrated as a bi-level neural system because both high-level functions and low-level functions are performed by NBF 200, although one skilled in the art will recognize that the NBF 200 need not be bi-level in order to fall within the scope of this invention.

NBF 200 may include an intra-evolvable neural interface (intra-ENI) 202, which may be operably coupled to a heuristic neural system (HNS) 204 and/or operably coupled to an autonomous neural system (ANS) 206. The HNS 204 may perform high-level functions, while the ANS 206 may perform low-level functions that are often described as "motor functions." In an embodiment of NBF 200, the HNS 204 and the ANS 206 may in aggregate provide a function of a biological neural system. As used herein, the intra-ENI 202 is an ENI that is wholly contained within an NBF, and is therefore prefixed with "intra."

The intra-ENI 202 may send action messages to and receive request messages from the HNS 204 and the ANS 206 during learning and task execution cycles, as well as during interfacing operations between the intra-ENI and the HNS 204 and the ANS 206 when the HNS 204 and the ANS 206 need to be modified as a result of other system failures or modification of objectives. In some embodiments, NBF 200 is preferably a worker NBF because this NBF performs functions, but does not provide instructions commands to other NBFs.

Figure 3:
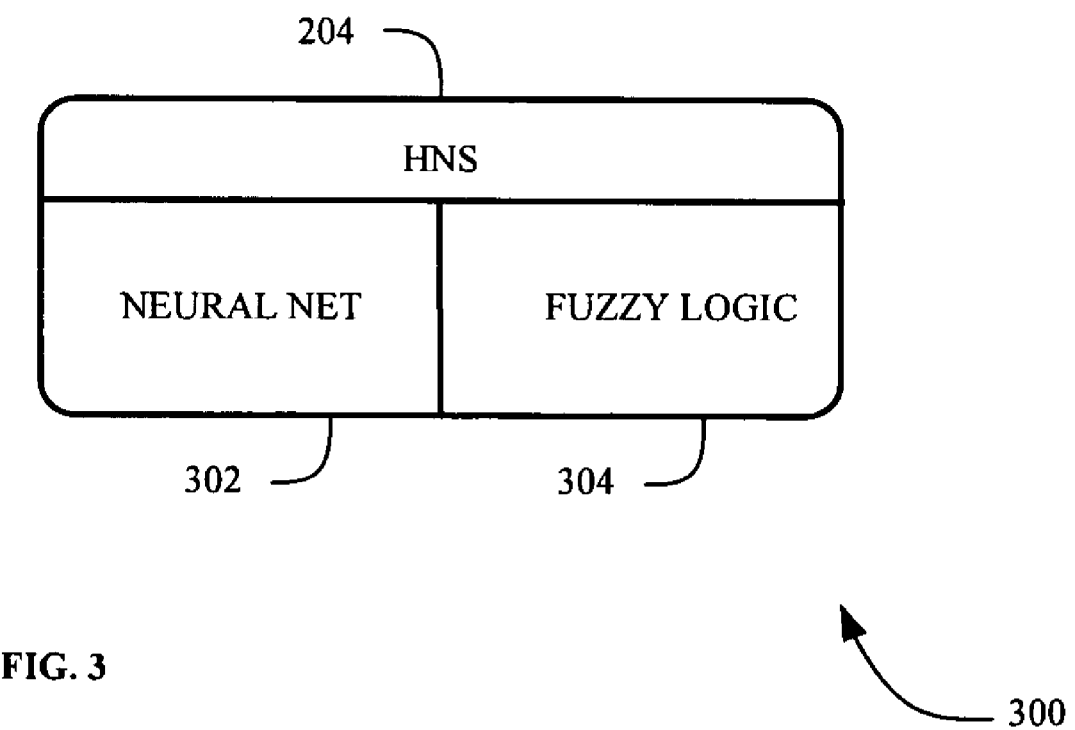
FIG. 3 is a block diagram of a heuristic neural system, according to an embodiment.

FIG. 3 is a block diagram of a heuristic neural system 300, according to an embodiment.

According to some embodiments, the heuristic neural system (HNS) 300 may be composed of a neural net 302 for pattern recognition and a fuzzy logic package 304 to perform decisions based on recognitions. Taken together the neural net 302 and the fuzzy logic package 304 may form a basis for a higher level heuristic intelligence.

Figure 4:
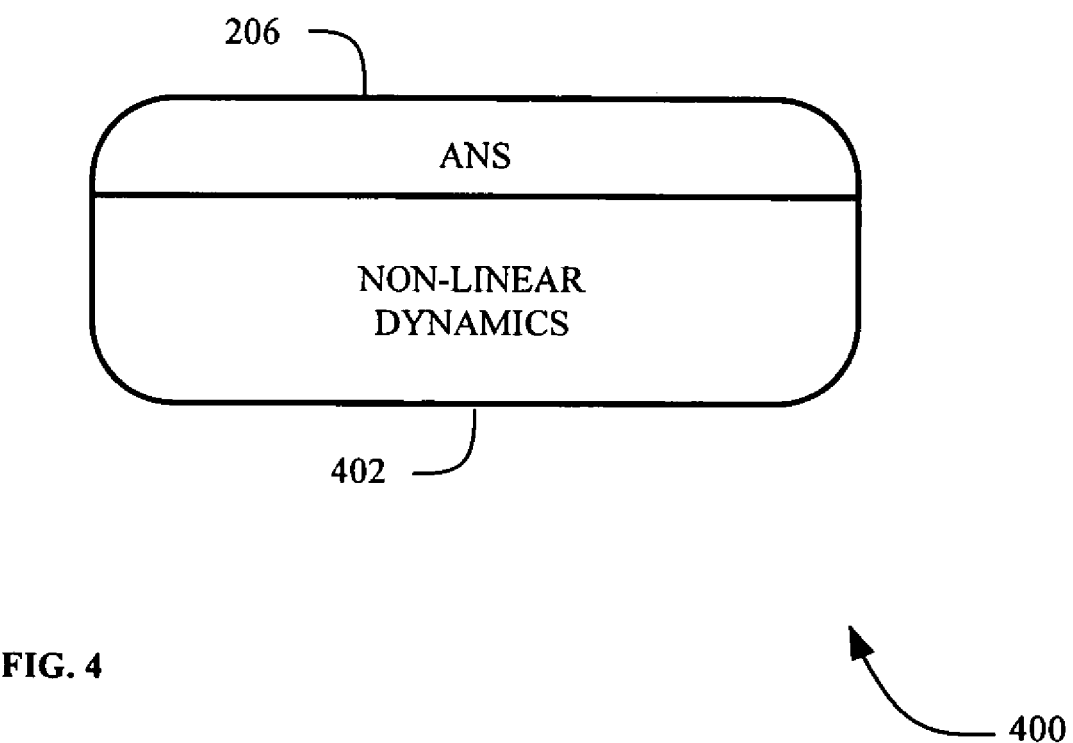
FIG. 4 is a block diagram of an autonomous neural system, according to an embodiment.

FIG. 4 is a block diagram of an autonomous neural system 400, according to an embodiment.

Figure 5:
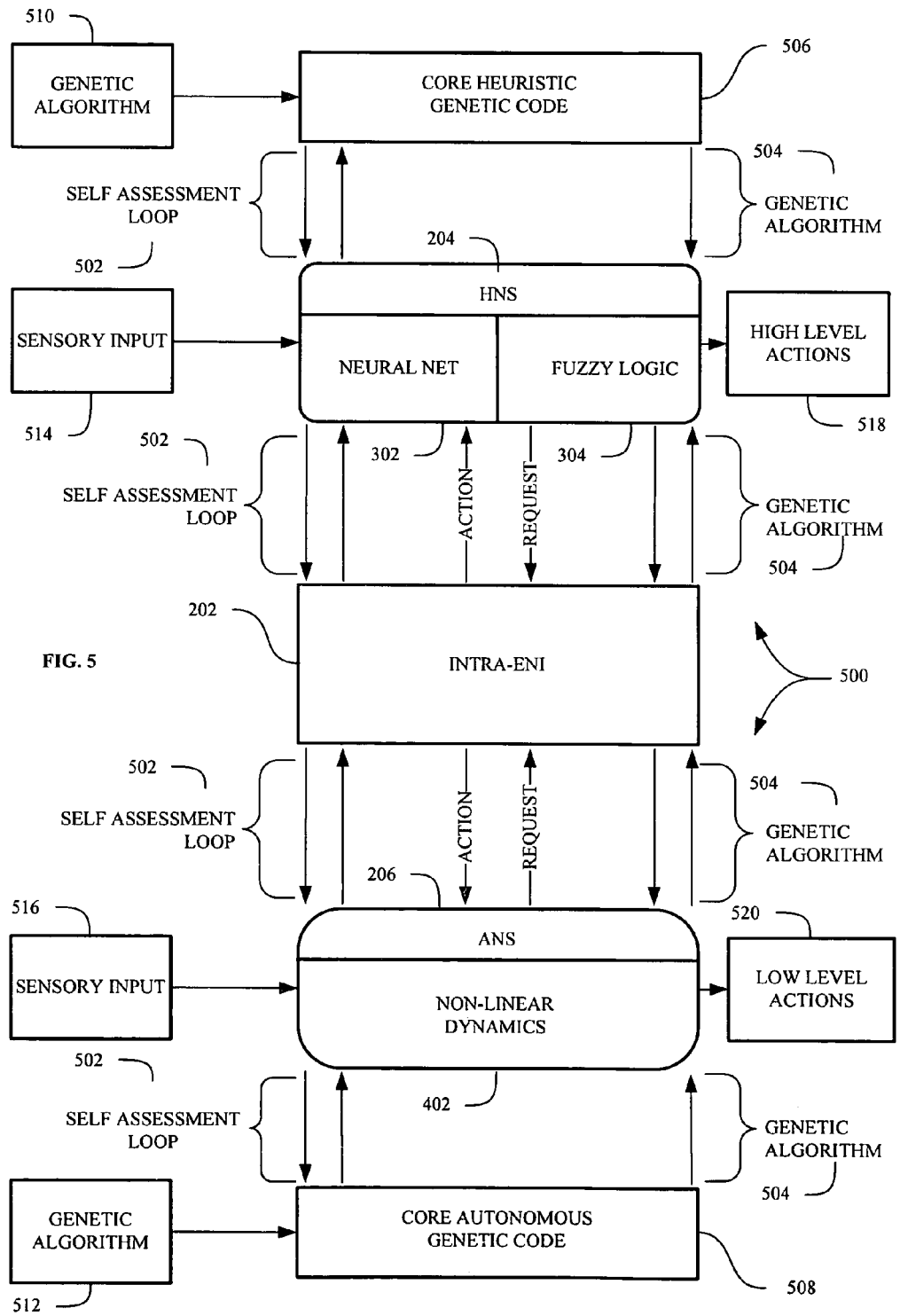
FIG. 5 is a block diagram of a neural basis function of a worker, according to an embodiment.

The illustrated autonomous neural system (ANS) 400 may include a non-linear dynamics simulation 402 that represents smart servo system behavior FIG. 5 is a block diagram of a neural basis function (NBF) 500 of a worker, according to an embodiment. In some embodiments, NBF 500 may be a bi-level neural system, as described above.

In some embodiments, NBF 500 includes a self assessment loop (SAL) 502 at each interface between autonomic components. Each SAL 502 may continuously gauge efficiency of operations of the combined HNS 204 and ANS 206. The standards and criteria of the efficiency are preferably set or defined by objectives of the NBF 500.

In some embodiments, NBF 500 also includes genetic algorithms (GA) 504 at each interface between autonomic components. The GAs 504 may modify the intra-ENI 202 to satisfy requirements of the SALs 502 during learning, task execution or impairment of other subsystems.

Similarly, the HNS 204 may have a SAL 502 interface and a GA 504 interface to a core heuristic genetic code (CHGC) 506, and the ANS 206 may have a SAL 502 interface and a GA 504 interface to a core autonomous genetic code (CAGC) 508. The CHGC 506 and CAGC 508 may allow modifications to a worker functionality in response to new objectives or injury. According to some embodiments, the CHGC 506 and the CAGC 508 autonomic elements are preferably not part of an operational neural system, but rather store architectural constraints on the operating neural system for both parts of the bi-level system. The CHGC 506 and the CAGC 508 may both be modifiable depending on variations in sensory inputs via GAs 504.

In some embodiments, the CHGC 506 and the CAGC 508 in conjunction with SALs 502 and GAs 504 may be generalized within this self similar neural system to reconfigure the relationship between NBFs, as well as to permit the instantiation of new NBFs to increase the overall fitness of the neural system. Thus, NBF 500 may provide a form of evolution possible only over generations of NBF workers.

In some embodiments, NBF 500 may also include genetic algorithms 510 and 512 that provide process information to the CHGC 506 and the CAGC 508, respectively. Moreover, HNS 204 and ANS 206 may receive sensory input 514 and 516, respectively, and may process the sensory input, thereby generating high level actions 518 and low level actions 520, respectively.

Figure 6:
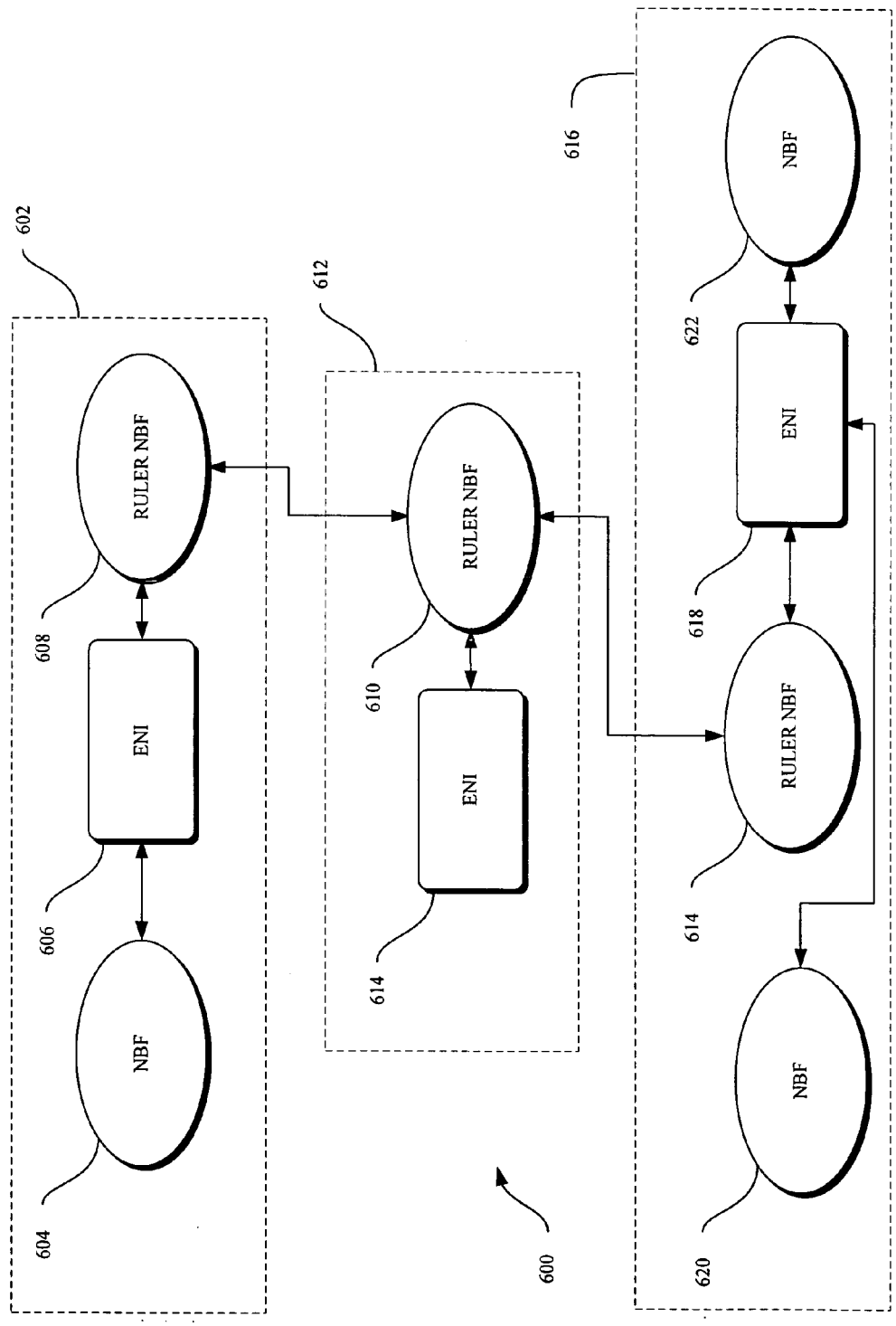
FIG. 6 is a block diagram of a multiple level hierarchical evolvable synthetic neural system, according to an embodiment.

FIG. 6 is a block diagram of a multiple level hierarchical evolvable synthetic neural system (ESNS) 600, according to an embodiment.

The preferred multiple level hierarchical ESNS 600 may include a first level of hierarchy 602 that may include a NBF 604 and inter-ENI 606 and a ruler NBF 608. A ruler NBF, such as illustrated ruler NBF 608, performs functions and also provides instructions and commands to other subordinate NBFs. Other configurations will be apparent to those skilled in the art.

In some embodiments, the ruler NBF 608 of the first hierarchical level 602 may be operably coupled to a ruler NBF 610 in a second hierarchical level 612. Ruler NBF 610 may perform functions and receive instructions and commands from other ruler NBFs that are higher in the hierarchy of the ESNS 600 and may also provide instructions commands to other subordinate NBFs.

As shown in FIG. 6, the second hierarchical level 612 may also include an inter-ENI 614. The second hierarchical level 612 shows the embodiment of an ESNS 600 having one NBF operably coupled to an ENI, although one skilled in the art will observe that other configurations are possible that fall within the purview of this invention. The ruler NBF 610 of the second hierarchical level 612 may be operably coupled to a ruler NBF 614 in a third hierarchical level 616.

The third hierarchical level 616 may also include an inter-ENI 618. The third hierarchical level 616 shows the embodiment of an ESNS 600 having more than two NBFs (e.g. 614,

620 and 622) operably coupled to an ENI, although one skilled in the art will know that other configurations fit within the scope of this invention.

Furthermore, in some embodiments, the NBFs 604, 608, 610, 614, 620 and 622 may include the aspects of NBFs 102 and 104 in FIG. 1 above, and/or NBF 200 in FIG. 2 above.

Figure 13:
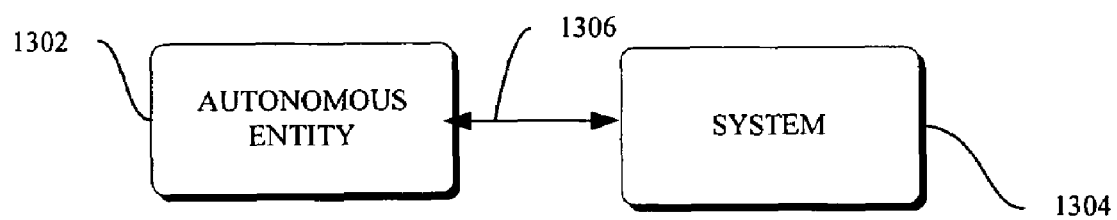
FIG. 13 is a diagram of an autonomous entity managing a system, according to an embodiment.

FIG. 13 is a block diagram of an autonomic entity management system 1300, according to an embodiment. The illustrated system 1304 is preferably a generic system because it may represent a myriad of devices and/or processes that perform a task in accordance to its programming or design. For example, the system 1304 might be software for updating or for synchronizing a file, the system 1304 could be a worker craft containing unique instrumentation for data gathering in an autonomous nanotechnology swarm, or the system 1304 could be an application for managing resources in networks or general purpose computers. Moreover, the system 1304 may have multiple applications and capabilities, such as self-healing and self-monitoring, but preferably the system 1304 may include a way of communicating a functional status and operating state signal to the managing autonomous entity manager 1302. Thus, the system 1304 may exhibit the properties of being self-managing and self-governing, often termed autonomic, pervasive, sustainable, ubiquitous, biologically inspired, organic or similar.

While the autonomic entity management system 1300 is shown as discrete autonomic components it should be understood by those skilled in the art that autonomic computing is dependent on many disciplines for its success, including research in agent technologies. The autonomic manager 1302 or system 1304 may be agents themselves containing functionality for measurement and event correlation and support for policy based control.

The functioning status may be represented by a heartbeat monitor (HBM) signal that indicates that the system 1304 is still functioning as designed. A preferred HBM signal may essentially be an "I am alive" signal to the autonomic manager, such as autonomic entity 1302, indicating that the system is functioning. These signals may be communicated from system 1304 through an appropriate bidirectional communication link 1306. The response from the autonomous manager 1302 may use the same link to influence system 1304. The communication link may be one or more radio link, data bus, a call procedure when implemented as software, or any other link presently existing or to be developed for facilitating communication between autonomic elements.

The operating state signal may be represented by a pulse monitor (PBM) signal. The PBM signal may be used by the autonomic entity 1302 or autonomic manager to infer potential warning conditions so preparations can be made to handle changing processing loads, impact on mission objectives, planning for correction, and possible substitute or reassignment of role or functionality to perform the desired objectives of system 1304. Other uses will be known to those skilled in the art. Autonomous manager 1302 may include the additional option of generating a stay-alive signal that might be used to safeguard resources, safeguard the completion of the objectives, and safeguard the system 1304 by removing the offending agent or the sub-component of system 1304. The stay-alive signal may borrow from the process of apoptosis in biological systems for cell self-destruction to maintain growth and protect the biological system from catastrophe. In biological systems, self-destruct is an intrinsic property that is delayed due to the continuous receipt of biochemical reprieves. The process is referred to as apoptosis, meaning "drop out," the origin of the word being derived from and descriptive of dropping of leaves from trees; i.e., loss of cells that ought to die in the midst of a living structure. This process has also been nicknamed "death by default," where cells are prevented from putting an end to themselves due to constant receipt of biochemical stay-alive signals. In the present arrangement, self-destruction may be usable in preventing certain conditions and undesirable emergent behavior that have been shown to influence system performance and thus mission objectives. While self-destruction in some circumstances may be viewed as a last resort to prevent further damage, in other situations, such as security of the agent or system 1304, self-destruction may be used as an intrinsic part of the process, such as blocking the autonomic entity from communicating or using the resources of the system.

Figure 14:
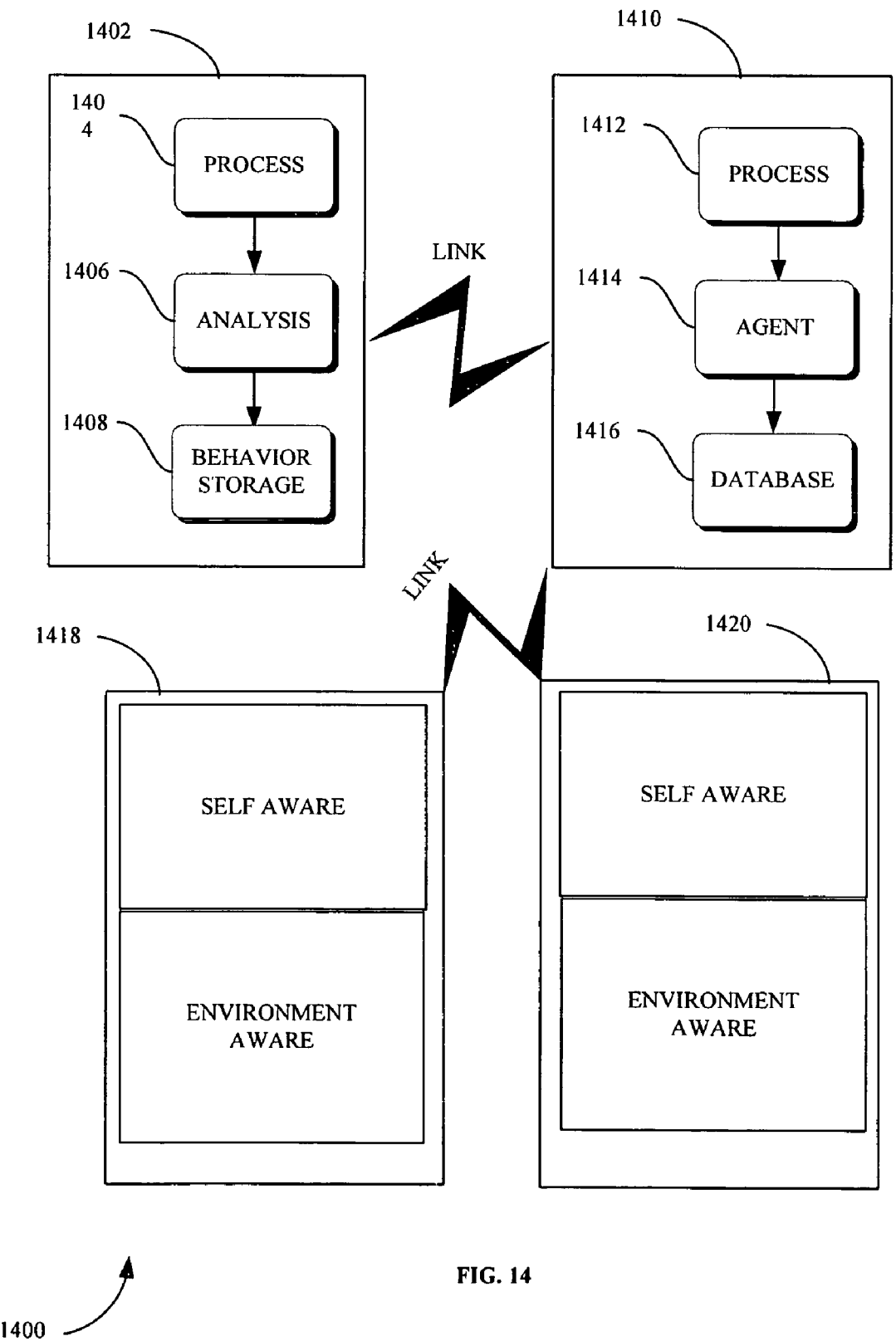
FIG. 14 is a diagram of autonomous entities interaction, according to an embodiment.

FIG. 14 is a diagram representation of a plurality of autonomic entities that have been assembled to perform a task, according to an embodiment. These entities may be self-configuring, meaning they adapt automatically to dynamically changing environments; self-optimizing, meaning they monitor and tune resources automatically; self-protecting, meaning they anticipate, detect, identify, and protect against attacks from anywhere; and self-healing, meaning they discover, diagnose, and react to disruptions. As shown with reference to autonomic entities 1418 and 1420, autonomic computing typically has a self-aware layer and an environment-aware layer. The self-aware layer of the autonomic entity (agent or other) may include a managed component and autonomic manager, which may be an agent, termed a self-managing cell (SMC). Control loops with sensors (self-monitor) and effectors (self-adjuster) together with system knowledge and planning/adapting policies may allow the autonomic entities to be self-aware and to self-manage. A similar scheme may facilitate environment-awareness: allowing self-managing if necessary, but without the immediate control to change the environment. This may be affected through communication with other autonomic managers that have the relevant influence, through reflex or event messages. The autonomic entities may be arranged or assigned distinctive roles such as worker entities, coordinating or managing entities, and message entities. Based on the task, a ruler entity may be assigned a set of worker entities to manage, typically inclusive of determining if a stay-alive signal ought to be withdrawn. Further, the communication between the ruler and the worker may be facilitated through the message entity. The message entity may have the additional task of communicating with a remote system. In the case of space exploration, the remote system might be mission control on earth, mission control on an orbital platform, or any other arrangement that is external to the collection of autonomic elements. To one skilled in the art, it is foreseeable that the remote system may be an autonomous entity acting like the project manager for the mission. Communication with mission control, in this case, might be limited to the download of science data and status information. An example of such a grouping is shown in FIG. 14, where autonomic entity 1402 is a ruler entity, autonomic entity 1410 is a message entity, and autonomic entities 1418 and 1420 are examples of worker entities. In terms of hardware, these entities may all be identical with the discernable difference possibly being programming to accomplish assigned tasks. An added advantage to having identical hardware might be that replacing failed entities could be accomplished by activating software code found in the autonomic entity. If hardware differences exist they may be based on specialized equipment suitable for a particular task. However, at a minimum, certain functions or roles, such as ruler and messenger, might be expected to be within the skilled set of all the autonomic entities.

As shown in FIG. 14, ruler autonomic entity 1402 comprises program or process (1404) executing in ruler entity 1402. Ruler entity 1402 may be implemented using a data processing system, such as data processing system 1002, shown in FIG. 10, or in the form of an autonomous agent compiled by a data processing system. In the alternative, the ruler entity may be an autonomous nanotechnology swarm that is launched from a stationary factory ship to explore planets, asteroids, comets, or the like. Further, analysis module 1406 or agent as executed by ruler entity 1402 may be used to monitor process 1402 and to receive pulse monitor and heartbeat monitor signals from worker entities through the messenger entity. When analysis module 1406 is used to monitor process 1404 it may be to detect errors or problems with the operation of process 1404.

As shown in FIG. 14, analysis agent 1406 may include an evaluator or other monitoring engine used to monitor the operation of process 1404. Analysis agent 1406 may be executed in response to some event, such as a periodic event, for example the passage of some period of time or the receipt of data from one or more of the worker entities. Further, the event may be the initialization of internal procedures in process 1404 or the starting or restarting of ruler entity 1402. Depending on the particular implementation, analysis agent 1406 may continuously run in the background monitoring process 1404 and analyzing the worker entity signals. See method 1500 for an example of actions taken by analysis agent module 1406 in formulating a strategy for the worker entities. Further, analysis agent 1404 may be subject to any self-healing routines found in ruler entity 1402.

This monitoring by analysis agent 1406 may be based on rules stored in behavior storage 1408, which may be used to compare the actual behavior of the received data to an expected behavior as defined in behavior storage 1408. In the present arrangement, behavior storage 1408 (ruler entity 1402) is shown to comprise a collection of rules that may be updated by a remote computer through the messenger entity that reflects most current fixes (self-healing) or repair procedures and responses to worker entities upon the occurrence of an event, change in condition, or deviation from a normal operation. Behavior storage 1408 may be narrowly tailored based on the use and purpose of the autonomic entity, such as messenger entity 1410 and have only those procedures needed to perform its programming.

When messenger entity 1410 connects to a remote computer at a command and control station, database 1416 may be updated with information that may later be used to program ruler entity or worker entity. In some cases a copy of the rules in database 1416 may contain the most up-to-date information. If the objective changes or a solution to a problem requires an updated version not found within the autonomic entity, the other entities may attempt to contact the messenger entity 1410 to see if more recent or up-to-date information is available. If updates are available, these updates may be sent to the requesting entity for processing.

The information in behavior storage 1408 and databases in the messenger and worker entities may include an array of values that are expected when selected processes or operations are implemented in the respective entity. Examples of processes may be initializing software, timing requirements, synchronization of software modules, and other metrics that may provide information concerning the running of a process within the respective entity. Examples of operations are data gathering, processing of information, controlling machinery, or any other operation where data processing systems are employed. Other examples of processes and operations are known to those skilled in the art. These expected values may be compared to determine if an error condition has occurred in the operation of the entity. An error condition may be analyzed to determine its causes and possible correction. In the case of a worker entity, the error may be internally analyzed to select the appropriate self-healing procedure and the error may be sent to the ruler entity to be analyzed by analysis agent 1406 using the rules in behavior storage 1408. Based on the analysis, the ruler entity may elect to either withdraw the stay-alive signal to the malfunctioning worker entity or wait a selected period to generate one or more stay-alive signal, withdrawal of a stay-alive signal, or a self-destruct signal. If the stay-alive signal is withdrawn, the malfunctioning entity may be disconnected from the operation and the task may then be assigned to another entity or partially performed by the remaining entity to insure its completion.

Figure 17:
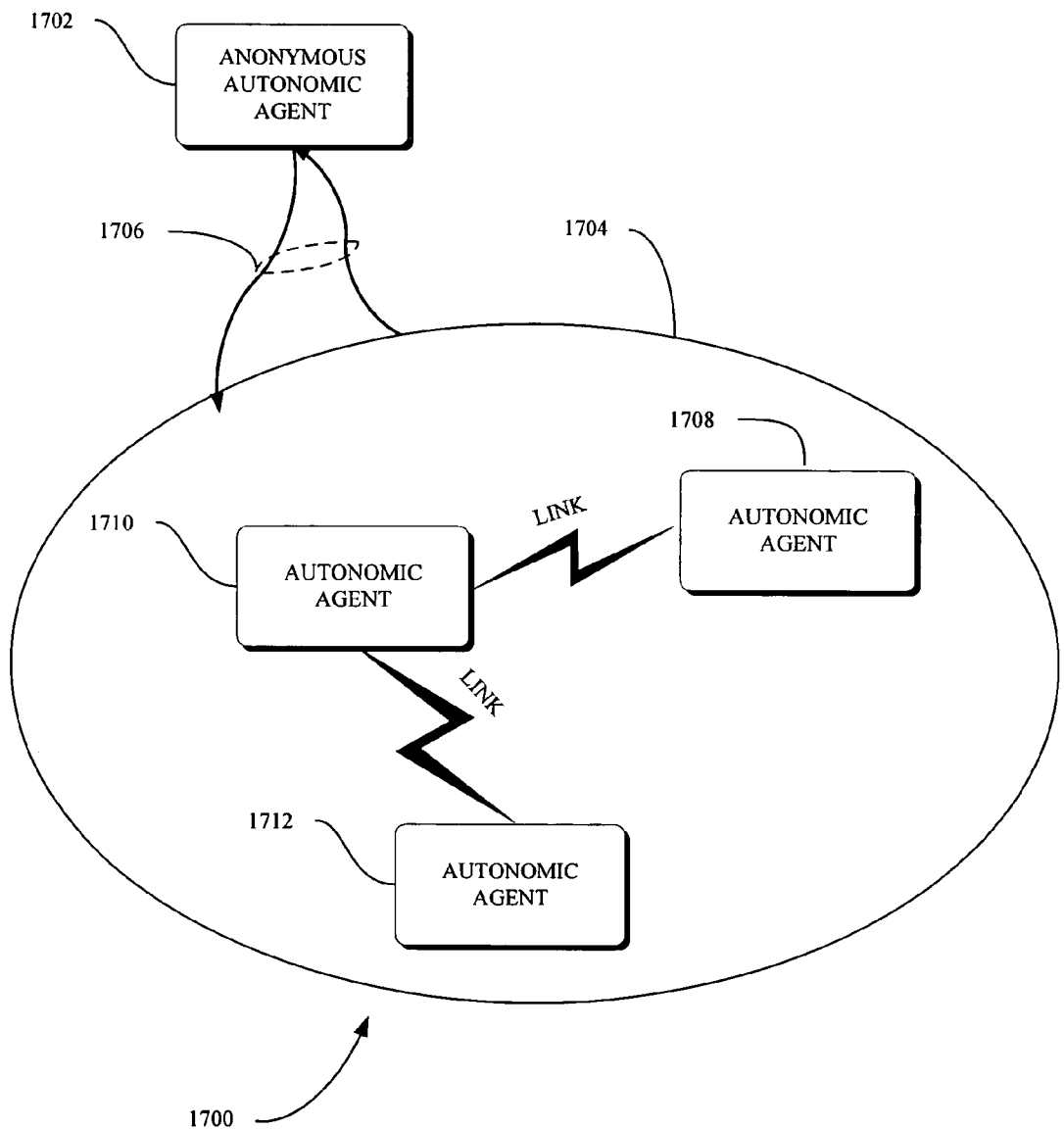
FIG. 17 is a diagram of autonomous entities interaction, according to an embodiment, when encountering an anonymous autonomic agent.

FIG. 17 is a block diagram of an autonomous entity management system 1700, according to an embodiment. The system 1700 may be a generic system because it can represent a myriad of possible combinations of devices and processes that perform a task in accordance to its programming or design. The system may represent an instance when an autonomous system 1704 encounters an anonymous autonomic agent 1702. An anonymous autonomous agent could be a visiting agent, such as a mobile agent that may enter the sphere of influence of the autonomous system 1704, or any device for which the autonomous system 1704 has no established relationship. Example encounters include a wireless device (agent) and communication tower (system), a client and server, a video subscriber and video provider, and a process and an operating system. One skilled in the art will know that other encounters are included within the scope of this invention. System 1700 may solve the need in the art for management of autonomous entities that can be functionally extracted from an environment upon the occurrence of a predetermined condition such as a potential security breach.

The autonomous system 1704 may comprise one or more autonomic agent 1708, 1710, and 1712, all performing assigned functions and roles. As noted earlier, roles may be some combination of ruler, messenger, and worker. Functions may include data gathering, communication functions, scheduling, controlling, and security. Other roles and functions will be known to those skilled in the art. Upon detecting anonymous autonomic agent 1702, the assigned autonomous agent for performing security functions for autonomous system 1704 may interrogate the anonymous autonomic agent 1702, requesting production of valid credentials. It should be noted at this point that detection may occur by employing various schemes, such as when the anonymous autonomic agent 1702 requests resources from the system 1704 or from any autonomous entity that forms part of the system, response to polling signals from the autonomous system 1704, or through a friend or foe signal that indicates the presence of a anonymous entity 1702 in proximity to the autonomous system 1704.

To the autonomous system 1704, security may be important because compromises by the accidental misuse of hosts by agents, as well as the accidental or intentional misuse of agents by hosts and agents by other agents, may result in damage, denial-of-service, breach-of-privacy, harassment, social engineering, event-triggered attacks, and compound attacks. To prevent security breaches it may be important to ensure that visiting agents have valid and justified reasons for being there, as well as providing security to the visiting agent with interaction with other agents and hosts. Upon detection, the visiting agent 1702 may be sent an asynchronous Alice signal 1706 requiring valid credentials from the agent 1702. Alice is an acronym that stands for Autonomic license. The anonymous agent 1702 may need to work within the autonomic system 1704 to facilitate self-management, and thus the anonymous agent 1702 and its host may need to be able to identify each other's credentials through something such as an Alice signal. The autonomic system 1704 may establish certain response characteristics for the returned signal from the agent 1702. For example, the autonomic system 1704 may require a response in an appropriate format, within a certain timeout period, and with a valid and justified reason for being within the locust of interest or domain of the autonomous system 1704. Other possible response characteristics will be known to those skilled in the art. For protection the autonomic system 1704 may make an assessment of the quality of the response from the anonymous agent 1702 to ascertain the potential of the agent for causing harm to the autonomous system 1704. Based on this determination, the autonomous system 1704 may control the type of interaction with the agent 1702. The agent may be destroyed, blocked, partially blocked, have its stay-alive signal withdrawn, or be allowed to communicate with other agents within the autonomous system 1704. The protection may be triggered at any level of infraction or by a combination of infractions by the anonymous autonomous agent 1702 when responding to the Alice signal. Failure to identify itself appropriately following an Alice interrogation may result in being blocked from the system and given either a self-destruct signal, or having its "stay alive" reprieve withdrawn. The consequence of unacceptable response by an anonymous agent 1702, should it fail to respond within a timeout period, may be that the agent 1702 is determined to be an intruder or other invalid agent (process) and consequently it may be destroyed and/or excluded from communicating with other agents 1708, 1710, 1712 in the system.

Method Embodiments

In the previous section, apparatus embodiments are described. In this section, the particular methods of such embodiments are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware may also be composed of computer-executable instructions. In some embodiments, method 700 may be performed by a program executing on, or performed by firmware or hardware that is a part of a computer, such as computer 902 in FIG. 9.

Figure 7:
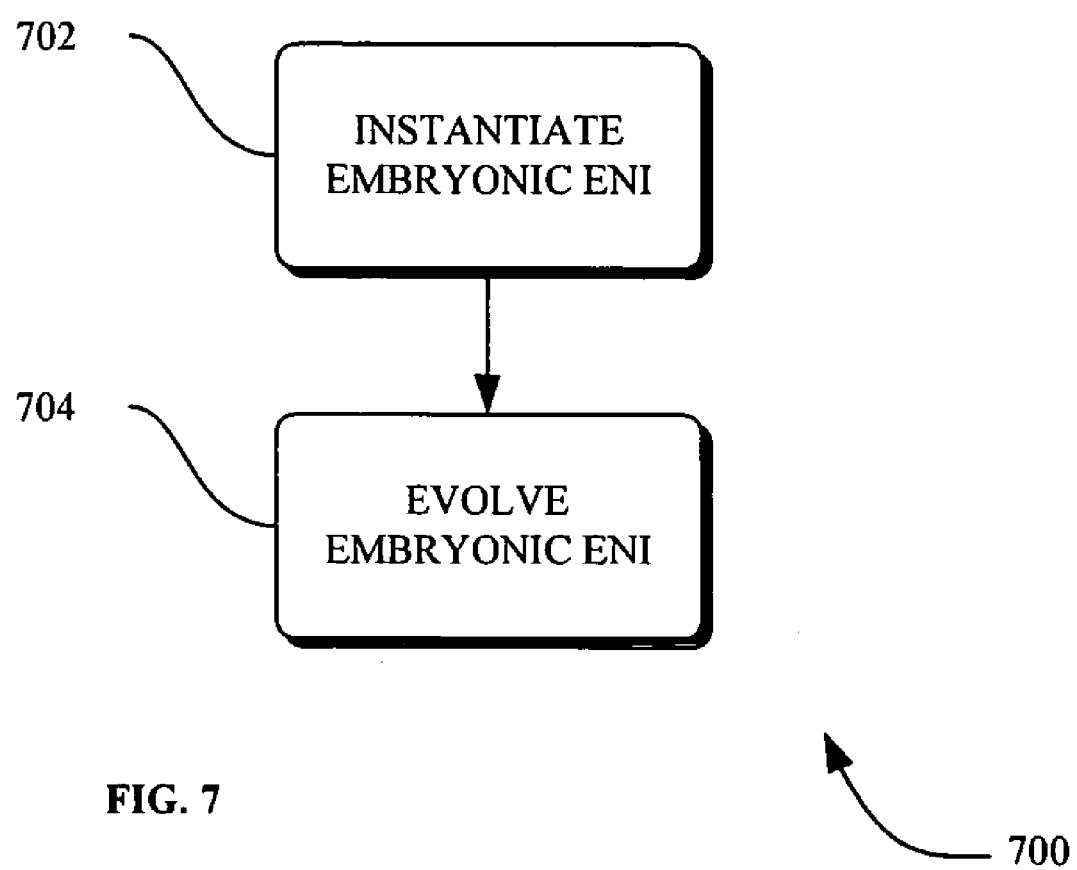
FIG. 7 is a flowchart of a method to construct an environment to satisfy increasingly demanding external requirements, according to an embodiment.

FIG. 7 is a flowchart of a method 700 to construct an environment to satisfy increasingly demanding external requirements, according to an embodiment.

Method 700 may include instantiating 702 an embryonic evolvable neural interface (ENI), such as inter-ENI 106. The embryonic ENI may lack a complete specification of the operational characteristics of the ESNS or an ENI. The embryonic ENI may be a neural thread possessing only the most primitive and minimal connectivity.

Method 700 may further include evolving 704 the embryonic ENI towards complex complete connectivity. Specifications of the inter-ENI 106 may be developed from the initial embryonic form. Thus, a very complex problem that in some embodiments is represented by a complete specification may be replaced by a more simple specification of the embryonic ENI that is evolved to meet increasingly demanding requirements. Progression from an embryonic state to a more complex state avoids the necessity of specifying the complex complete connectivity initially, but rather reduces the problem to one of developing methods to drive the evolution of simple limited connectivity to complex complete connectivity.

The adaptive or evolutionary nature of an artificial intelligence construct in method 700 may be predicated on an active revision of the embryonic ENI to meet external action requirements for a sensory input. In particular, the ENI, which preferably handles both the intra-NBF and inter-NBF connectivity, may evolve due to changing conditions that are either driven by training requirements or operational requirements.

In some embodiments, method 700 may be implemented as a computer data signal embodied in a carrier wave that represents a sequence of instructions, which, when executed by a processor, such as processor 904 in FIG. 9, may cause the processor to perform the respective method. In other embodiments, method 700 may be implemented as a computer-accessible medium having executable instructions capable of directing a processor, such as processor 904 in FIG. 9, to perform the respective method. In varying embodiments, the medium may a magnetic medium, an electronic medium, or an optical medium. Other mediums may be known to those skilled in the art.

Figure 15:
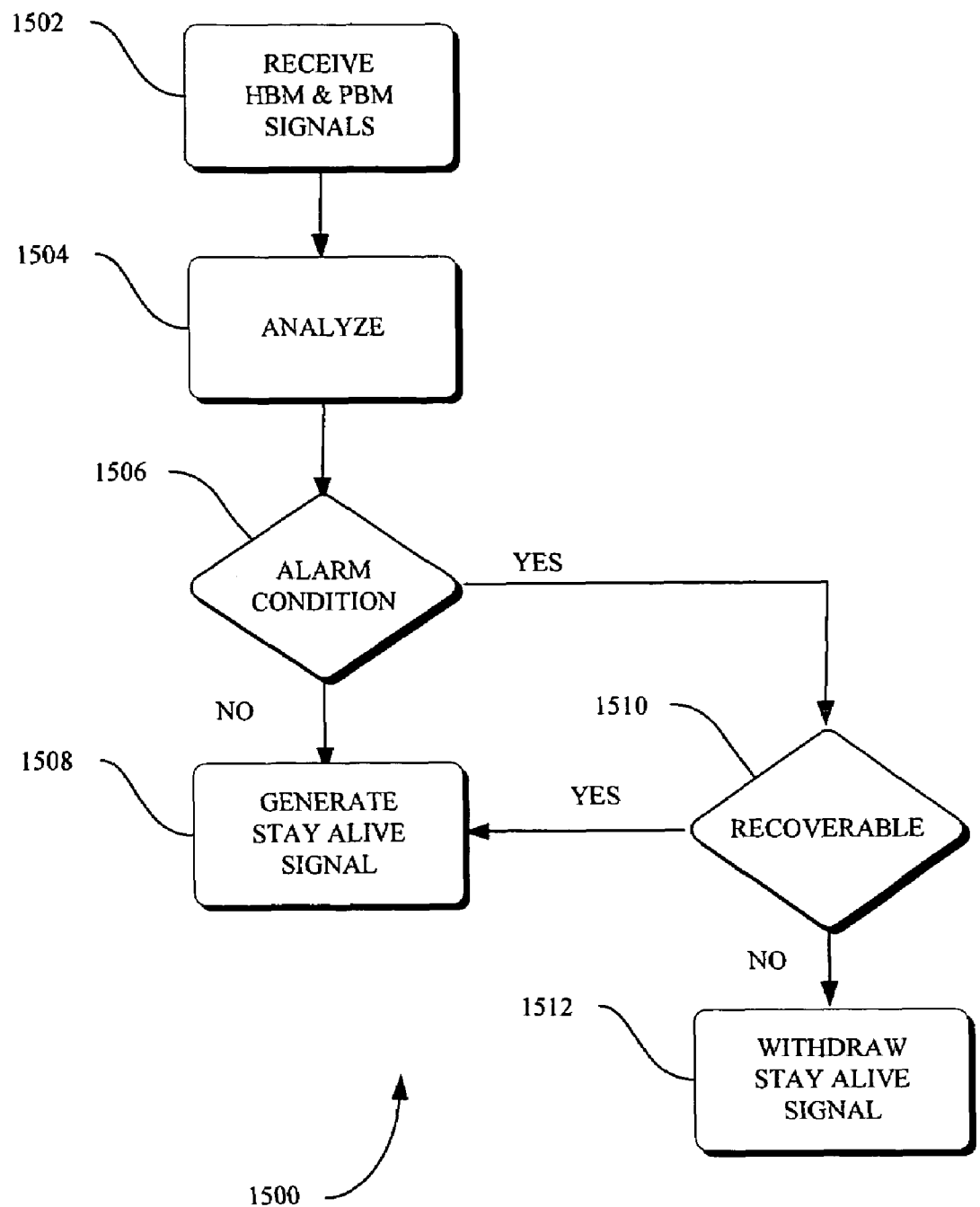
FIG. 15 is a flowchart of a method, according to an embodiment.

FIG. 15 is a flowchart of a method 1500 to construct an environment to satisfy increasingly demanding external requirements, according to an embodiment where a ruler entity decides to withdraw or generate a stay-alive signal. Method 1500 may solve the need in the art for management of autonomous entities that can be functionally extracted from an environment upon the occurrence of a predetermined condition. Method 1500 may begin with an action 1502 when receiving a signal from a managed entity.

Action 1502 may receive a heartbeat monitor (HBM) signal and/or a pulse monitor (PBM) signal from a managed entity such as worker entities 1418 or 1420. The HBM signal may be an indication that the managed entity (worker entity) is operating. The HBM signal may be an "ON/OFF" state signal, an indication that a process is being performed, or any other signal known in the art that can convey information that the worker entity is alive or active. The PBM signal may extend the HBM signal to incorporate reflex/urgency/health indicators from the autonomic manager representing its view of the current self-management state. The PBM signal thus may convey the performance and characteristics of the entity in the form of engineering data summarization to add context to the received HBM signal. Engineering data summarization may include a set of abstractions regarding sensors that may comprise rise and fall of data by a certain amount, external causes for parameter deviations, actual numerical value of the parameters being summarized, warning conditions, alarm conditions, and any other summarization known in the art that would convey the general health of the system. Once the HBM and PBM signals have been received control may be forwarded to action 1504 for further processing.

In action 1504, an analysis of the HBM and PBM signal may be performed to determine trends and possible areas of concern. The purpose of the analysis may be to determine divergence from a predetermined condition, make projection through simulation and data modeling areas of parameters that can lead to the failure of the worker entity or that might jeopardize the assigned mission, and ascertain the quality of performance of the system. Other purposes will be apparent to those skilled in the art. The analysis may be performed by using regression techniques, neural network techniques, statistical techniques, or any other technique known in the art that can convey information about the state of a system or emergent behavior of the system. Once the analysis has been performed, control may pass to action 1506 for further processing.

In action 1506, an alarmed condition may be determined. In action 1506, the analysis of action 1504 may be consulted to determine if there is one or more alarm condition that may trigger the withdrawal of a stay-alive signal. If it is determined that there are no alarm conditions, control may then pass to action 1508 so as to generate a stay alive signal. In the event that an alarm condition is present, control may then pass to action 1510 for further processing.

In action 1510, a determination may be made to ascertain if the identified alarmed condition of action 1506 is recoverable by the managed entity, such as worker entities 1418 and 1420 of FIG. 14. When an alarmed condition is determined to be recoverable, control may be passed to action 1508 to generate a stay-alive signal. When an alarmed condition is determined not to be recoverable, control may be passed to action 1512 to withdraw the stay-alive signal.

Figure 16:
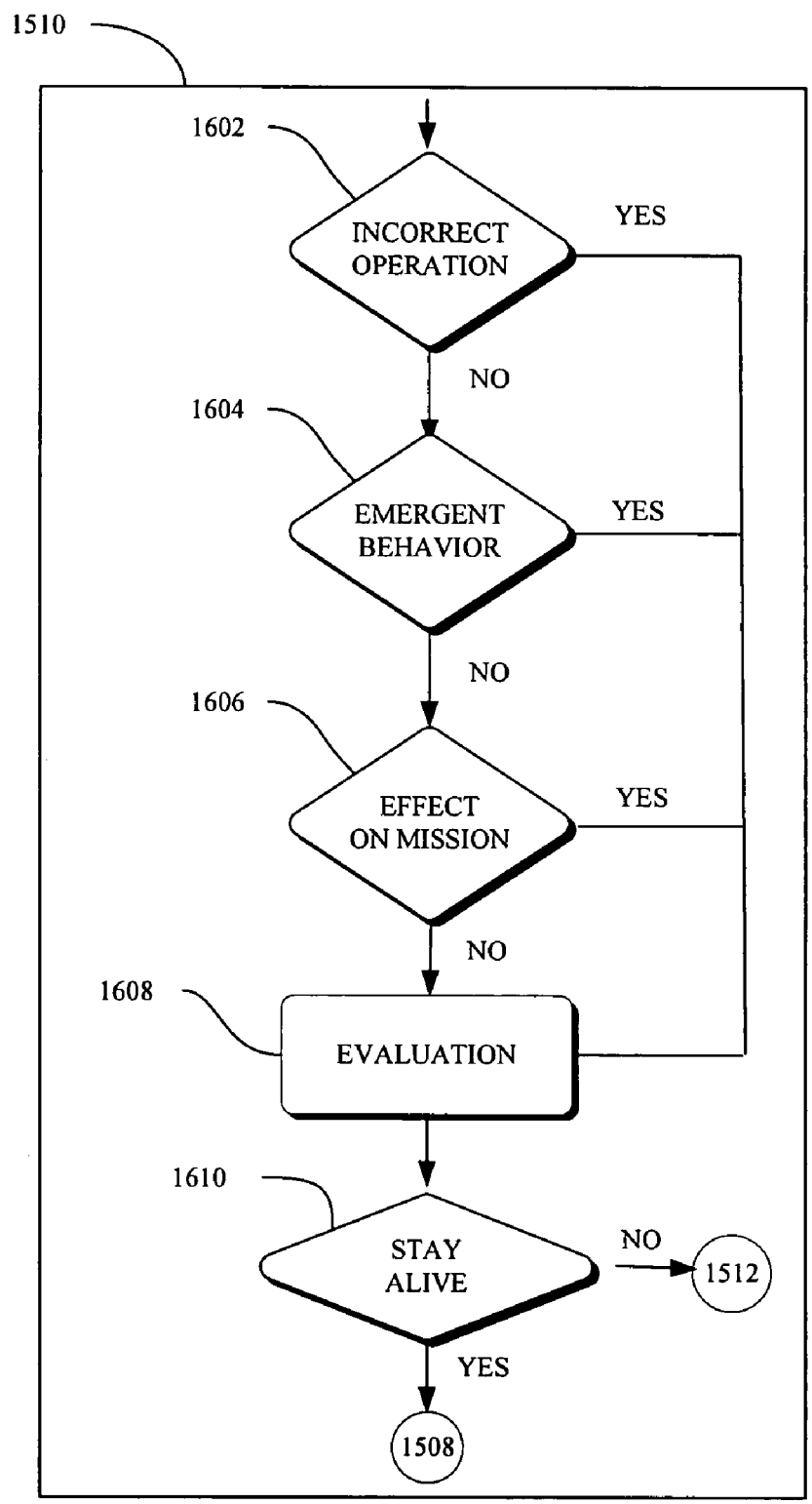
FIG. 16 is a flowchart for generating a stay alive signal when a warning condition occurs, according to an embodiment.

FIG. 16 is a flowchart of a method 15 10 for ascertaining the recoverability of an alarmed condition determined at action 1506, according to an embodiment. Method 1510 may solve the need in the art for management of autonomous entities that can be functionally extracted from an environment upon the occurrence of a predetermined condition. Method 1510 may begin with action 1602 when receiving one or more alarmed condition.

In action 1602, there may be a determination if an incorrect operation from the managed system has been identified in action 1504 of FIG. 15. An incorrect operation can range from not initializing sensors to failing to self-heal when internal decision logic recommends as an appropriate cause of action. One skilled in the art will appreciate that other types of incorrect operations not identified here may fall within the scope of this invention. In action 1602, in addition to determining if an incorrect operation has been identified, it may also be possible to ascertain the number of devices or processes within the entity that registered an incorrect operation. If at least one incorrect operation is determined, the action may transfer the identity of the unit to evaluation block 1608 for further processing.

In action 1604, there may be a determination of emergent behavior from the managed system that has been identified in action 1504 of FIG. 15. An emergent behavior or emergent property may appear when a number of entities (agents) operate in an environment forming behaviors that are more complex as a collective. The property itself may often be unpredictable and unprecedented and may represent a new level of the system's evolution. This complex behavior in the context of a control system may be known as non-linearity, chaos, or capacity limits. The complex behavior or properties may not be properties of any single such entity, nor may they easily be predicted or deduced from behavior in the lower-level entities. One reason why emergent behavior occurs may be that the number of interactions between autonomic components of a system increases with the number of autonomic components, thus potentially allowing for many new and subtle types of behavior to emerge. In this instance, there may be nothing that commands the system to form a pattern, but instead the interactions of each part (entities) to its immediate surroundings create a complex process that leads to order. Emergent behavior may be identified based on parameters that give rise to the complex behavior in a system such as demands on resources. Once an emergent behavior condition has been identified, the information may be forwarded to evaluation block 1608 for further processing.

In action 1606, a determination may be made of alarm conditions that may have an impact on the success of the mission or task which all entities are striving to accomplish. The impact could be the ability to accomplish individual tasks or the potential for failure of the overall mission by permitting an entity to stay alive. This impact may be determined through Bayesian belief networks, statistical inference engines, or by any other presently developed or future developed inference engine that can ascertain the impact on a particular task if one or more agent is showing incorrect operation or harmful emergent behavior. Once the impact has been determined, the information may be passed to evaluation block 1608 for further processing.

Evaluation block 1608 may marshal the incorrect operation identified in action 1602, the emergent behavior in action 1604, and the effect on the mission in action 1606 to suggest a course of action that the managed entities should adopt, which in some embodiments may be based on a stay-alive signal. The determination of withdrawing or affirming the stay alive signal may be based on the occurrence of one or more of the identified alarmed conditions, or a combination of two or more of the identified alarmed conditions. For example, the stay-alive signal could be withdrawn if there is emergent behavior and there would be an effect on the mission. As one alternative, the stay-alive signal could be affirmed if there was only emergent behavior, or incorrect operation. Once the evaluation is determined, control may pass to decision block 1610 for further processing in accordance to the decision made in evaluation block 1608.

In action 1610, if the desired control instruction is to maintain the stay-alive signal, control may be passed to action 1508 for further processing. In the alternative, a withdrawal of the stay-alive signal may be sent to action 1512 for further processing. It should be noted that generating a stay-alive signal is equivalent to actually generating a stay-alive signal, affirming a stay-alive signal, not withdrawing a stay-alive signal, or any other condition that can determine if an entity is to perish or to extinguish unless allowed to continue by another entity. The other entity may be a managing entity since it can determine the outcome (life or death) of another entity.

Figure 18:
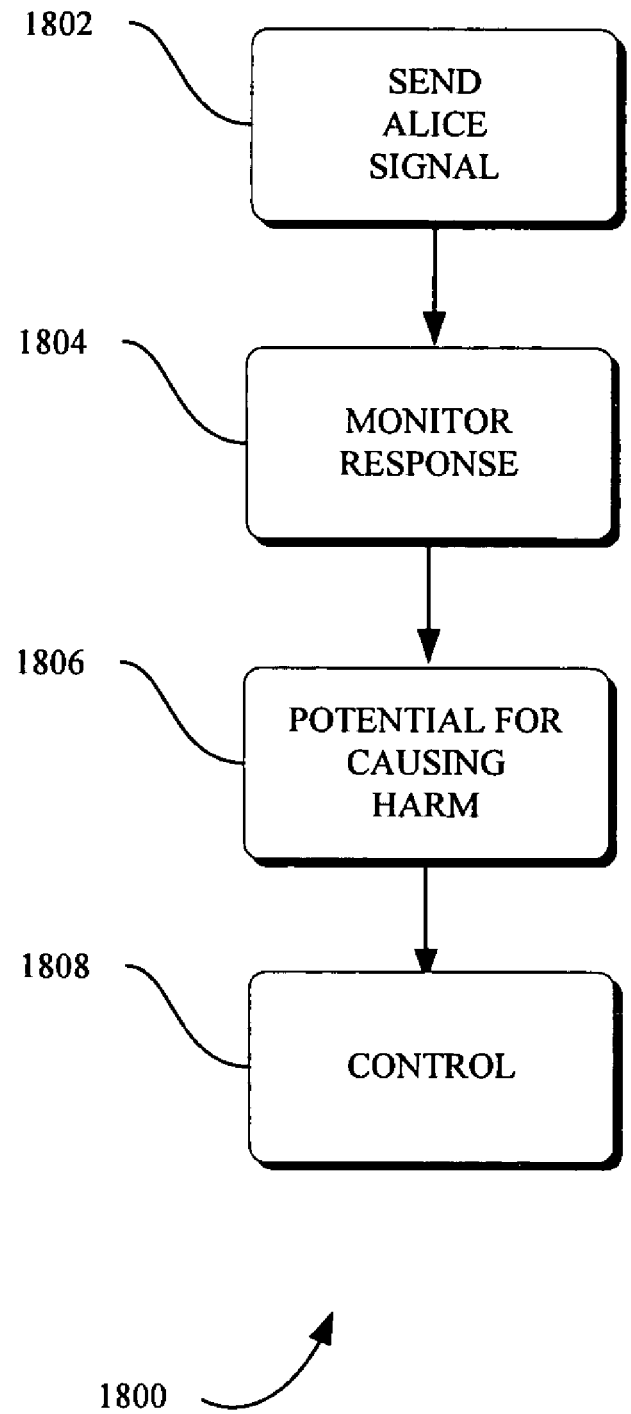
FIG. 18 is a flowchart for interrogating an anonymous autonomic agent, according to an embodiment.

FIG. 18 is a flowchart of a method 1800 for providing security requirements, according to an embodiment, where a ruler entity decides to withdraw or generate a stay alive signal from an anonymous agent. Method 1800 may solve the need in the art for management of autonomous entities that can be functionally extracted from an environment upon the occurrence of a predetermined condition. Method 1800 may begin with action 1802, where an Alice signal may be sent to an anonymous agent to ascertain the agent's potential for harm to a system as shown in FIG. 17. After the Alice signal has been sent to the agent, control may pass to action 1804 for further processing.

In action 1804, the response from the agent may be monitored. Monitored, as used herein, refers to maintaining regular surveillance, or close observation, over an anonymous agent and may include the absence of a signal. For example, not responding with a timeout period is considered, as used herein, as a monitor response. After action 1804 is completed, control may pass to action 1806 for further processing.

In action 1806, the monitored response from action 1804 may be analyzed to determine if the response is in an appropriate format, within a certain timeout period, and with a valid and justified reason for being within the locust of interest or domain of the autonomous system 1704 as shown in FIG. 17. Once the potential for causing harm has been ascertained, control may pass to action 1808 for further processing.

In action 1808, the system may control the future of the anonymous agent based on the potential for harm to the autonomous system. This mimics the mechanism of cell death in the human (and animal and plant) body, and hence makes use of autonomic and other biologically inspired metaphors. The technique might send self-destruct signals to agents that may be compromised, or which cannot be identified as friendly or as having a right to access certain resources. The concept of the Alice signal may be to challenge a (mobile) agent to determine if it is friendly and has permission to access certain resources. If it fails to identify itself appropriately following an Alice interrogation, it may be blocked from the system and given either a self-destruct signal or its stay alive reprieve may be withdrawn.

Hardware and Operating Environments

Figure 8:
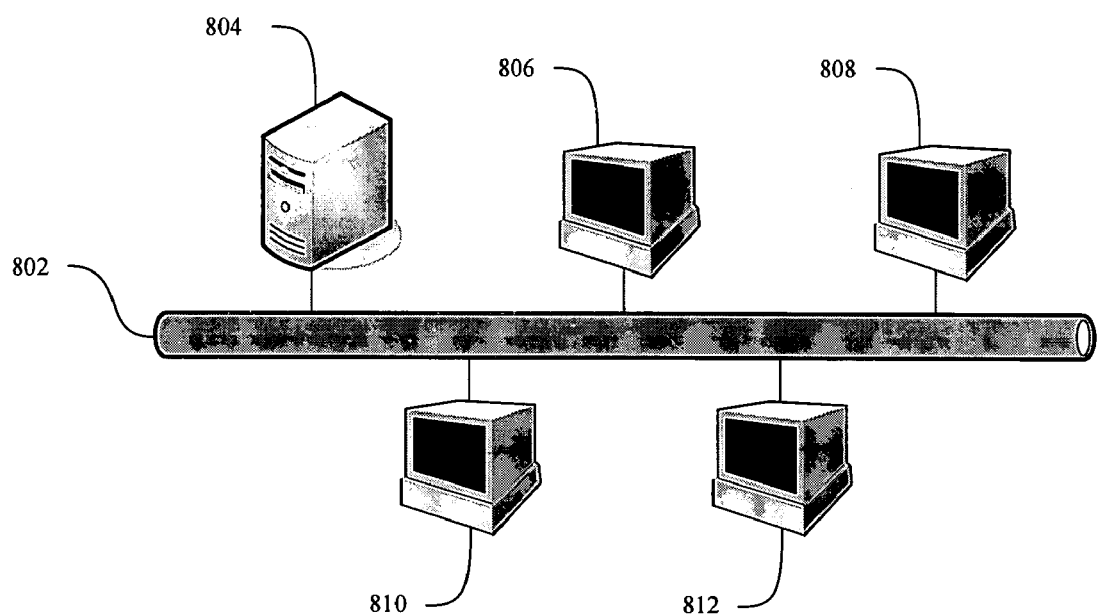
FIG. 8 is a block diagram of a conventional computer cluster environment in which different embodiments can be practiced.
Figure 10:
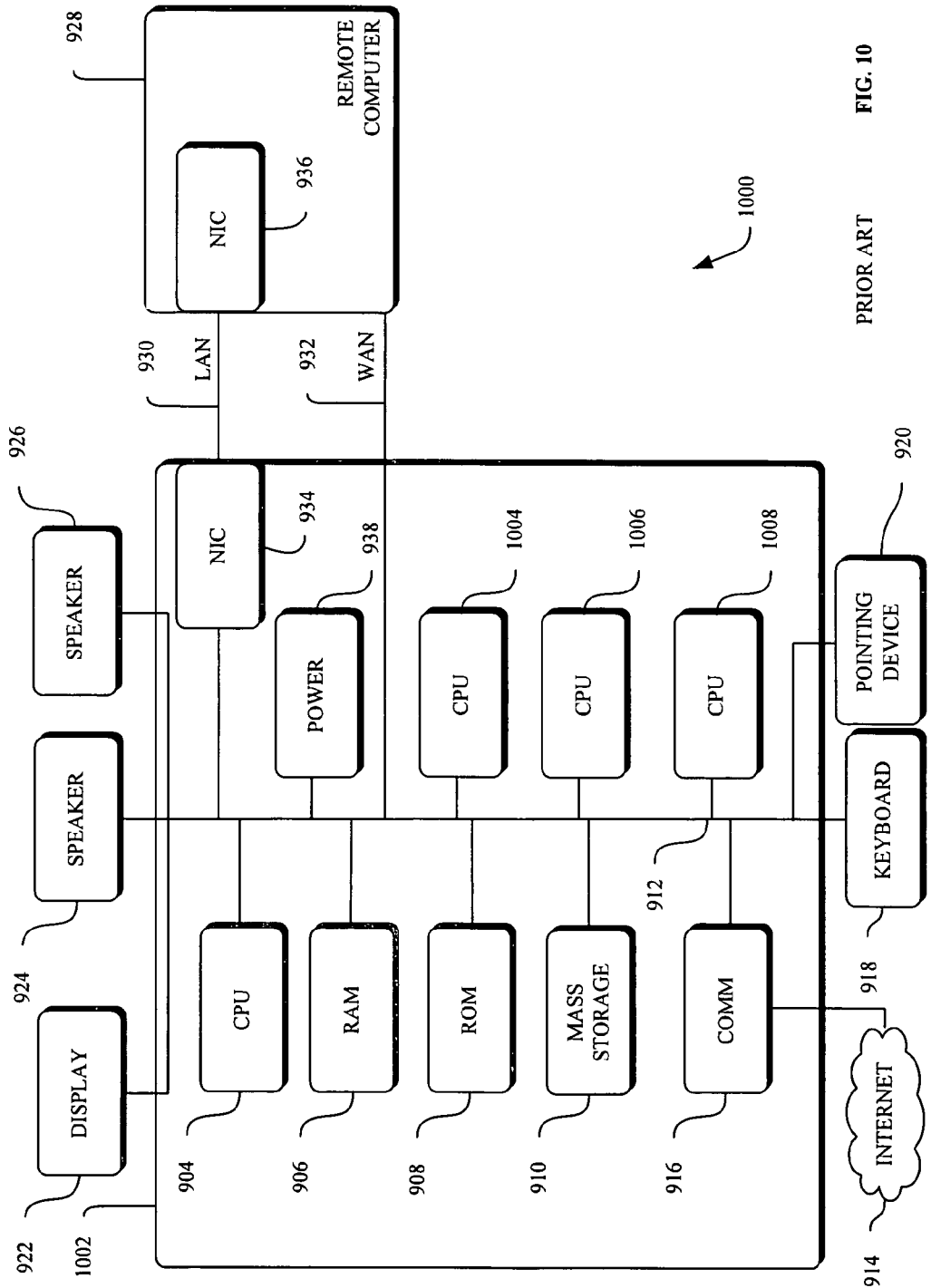
FIG. 10 is a block diagram of a conventional multiprocessor hardware and operating environment 1000 in which different embodiments can be practiced.

FIGS. 8, 9 and 10 are diagrams of hardware and operating environments in which different embodiments can be practiced. The description of FIGS. 8, 9 and 10 provide an overview of computer hardware and suitable autonomic computing environments in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server autonomic computing environments where remote devices that perform tasks are linked through a communications network. Program modules can be located in both local and remote memory storage devices in a distributed autonomic computing environment.

FIG. 8 is a block diagram of a computer cluster environment 800 in which different embodiments can be practiced. System 100, apparatus 200, 300, 400, 500, 600, method 700 and ESNS 1100 and 1200 may be implemented on computer cluster environment 800.

Computer cluster environment 800 may include a network 802, such as an EtherFast 10/100 backbone, that is operably coupled to a cluster server 804 and a plurality of computers 806, 808, 810 and 812. One embodiment of the computers is computer 902 described below with reference to FIG. 9. The plurality of computers may include any number of computers, but some implementations include 8, 16, 32 and as many as 512 computers. The ESNSs and NBFs described above may be distributed on the plurality of computers.

One example of the computer cluster environment 800 may be a Beowolf computer cluster. The computer cluster environment 800 provides an environment in which a plurality of ESNSs and NBFs can be hosted in an environment that facilitates cooperation and communication between the ESNSs and the NBFs.

FIG. 9 is a block diagram of a hardware and operating environment 900 in which different embodiments can be practiced. Computer 902 may include a processor 904, commercially available from Intel, Motorola, Cyrix and others known to those skilled in the art. Computer 902 may also include random-access memory (RAM) 906, read-only memory (ROM) 908, and one or more mass storage devices 910, and a system bus 912, that operatively couples various system components to the processing unit 904. The memory 906, 908, and mass storage devices 910, are types of computer-accessible media, although one skilled in the art will recognize that other media exist that fall within the purview of this invention. Mass storage devices 910 are more specifically types of nonvolatile computer-accessible media and may include, by way of example, one or more hard disk drives, floppy disk drives, optical disk drives, and tape cartridge drives. The processor 904 executes computer programs stored on the computer-accessible media.

Computer 902 may be communicatively connected to the Internet 914 via a communication device 916. Internet 914 connectivity is well known within the art. In one embodiment, a communication device 916 is a modem that responds to communication drivers to connect to the Internet via what is known in the art as a "dial-up connection." In another embodiment, a communication device 916 is an Ethernet® or similar hardware network card connected to a local-area network (LAN) that itself is connected to the Internet via what is known in the art as a "direct connection" (e.g., T1 line, etc.). Other types of connections are known in the art and may be suitable for the purposes of this invention.

A user may enter commands and information into the computer 902 through input devices such as a keyboard 918 or a pointing device 920. The keyboard 918 permits entry of textual information into computer 902, as known within the art, and embodiments are not limited to any particular type of keyboard. Pointing device 920 permits the control of the screen pointer provided by a graphical user interface (GUI) of operating systems, such as versions of Microsoft Windows® for example. Embodiments are not limited to any particular pointing device 920. Such pointing devices may include mice, touch pads, trackballs, remote controls and point sticks. Other input devices (not shown) may include a microphone, joystick, game pad, satellite dish, scanner, or the like.

In some embodiments, computer 902 may be operatively coupled to a display device 922. Display device 922 may be connected to the system bus 912. Display device 922 may permit the display of information, including computer, video and other information, for viewing by a user of the computer. Embodiments are not limited to any particular display device 922. Such display devices may include cathode ray tube (CRT) displays (monitors), as well as flat panel displays such as liquid crystal displays (LCDs). In addition to a monitor, computers typically include other peripheral input/output devices such as printers (not shown). Speakers 924 and 926 may provide audio output of signals. Speakers 924 and 926 may also be connected to the system bus 912.

Computer 902 may also include an operating system (not shown) that may be stored on the computer-accessible media RAM 906, ROM 908, and mass storage device 910, and may be executed by the processor 904. Examples of operating systems may include Microsoft Windows®, Apple MacOS®, Linux®, UNIX®. Examples are not limited to any particular operating system, however, and the construction and use of such operating systems are well known within the art.

Embodiments of computer 902 are not limited to any type of computer 902. In varying embodiments, computer 902 may comprise a PC-compatible computer, a MacOS®-compatible computer, a Linux®-compatible computer, or a UNIX®-compatible computer, although one skilled in the art will know that other types of computers may be used to carry out this invention. The construction and operation of such computers are well known within the art.

Computer 902 may be operated using at least one operating system to provide a graphical user interface (GUI), including a user-controllable pointer. Computer 902 may have at least one web browser application program executing within at least one operating system, to permit users of computer 902 to access an intranet, extranet or Internet world-wide-web pages as addressed by Universal Resource Locator (URL) addresses. Examples of browser application programs include Netscape Navigator® and Microsoft Internet Explorer®, although others are known in the art.

The computer 902 may operate in a networked environment using logical connections to one or more remote computers, such as remote computer 928. These logical connections may be achieved by a communication device coupled to, or a part of, the computer 902. Embodiments are not limited to a particular type of communications device. The remote computer 928 may be another computer, a server, a router, a network PC, a client, a peer device or other common network node. The logical connections depicted in FIG. 9 may include a local-area network (LAN) 930 and a wide-area network (WAN) 932. Such networking environments are commonplace in offices, enterprise-wide computer networks, intranets, extranets and the Internet.

When used in a LAN-networking environment, the computer 902 and remote computer 928 may be connected to the local network 930 through network interfaces or adapters 934, which is one type of communications device 916. Remote computer 928 may also include a network device 936. When used in a conventional WAN-networking environment, the computer 902 and remote computer 928 may communicate with a WAN 932 through modems (not shown). The modem, which may be internal or external, may be connected to the system bus 912. In a networked environment, program modules depicted relative to the computer 902, or portions thereof, may be stored in the remote computer 928.

Computer 902 may also include power supply 938, which may be a battery.

FIG. 10 is a block diagram of a multiprocessor hardware and operating environment 1000 in which different embodiments can be practiced. Computer 1002 may include a plurality of microprocessors, such as microprocessor 904, 1004, 1006, and 1008. The four microprocessors of computer 1002 is only one example of a multi-processor hardware and operating environment; other numbers of microprocessors may be used in other embodiments.

Similar to the computer cluster environment 800 in FIG. 8 above, the computer 1002 may provide an environment in which a plurality of ESNSs and NBFs may be hosted in an environment that facilitates cooperation and communication between the ESNSs and the NBFs.

Components of the system 100, apparatus 200, 300, 400, 500, 600, 1100, 1200 and method 700 may be embodied as computer hardware circuitry or as a computer-readable program, or a combination of both.

More specifically, in the computer-readable program embodiment, the programs may be structured in an object-orientation using an object-oriented language such as Java, Smalltalk or C++, and the programs may be structured in a procedural-orientation using a procedural-oriented language such as COBOL or C. Other object-oriented and procedural-oriented languages are known in the art. The software components may communicate in any of a number of ways that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI) and the like. The components may execute on as few as one computer as in computer 902 in FIG. 9, or on at least as many computers as there are components.

Figure 11:
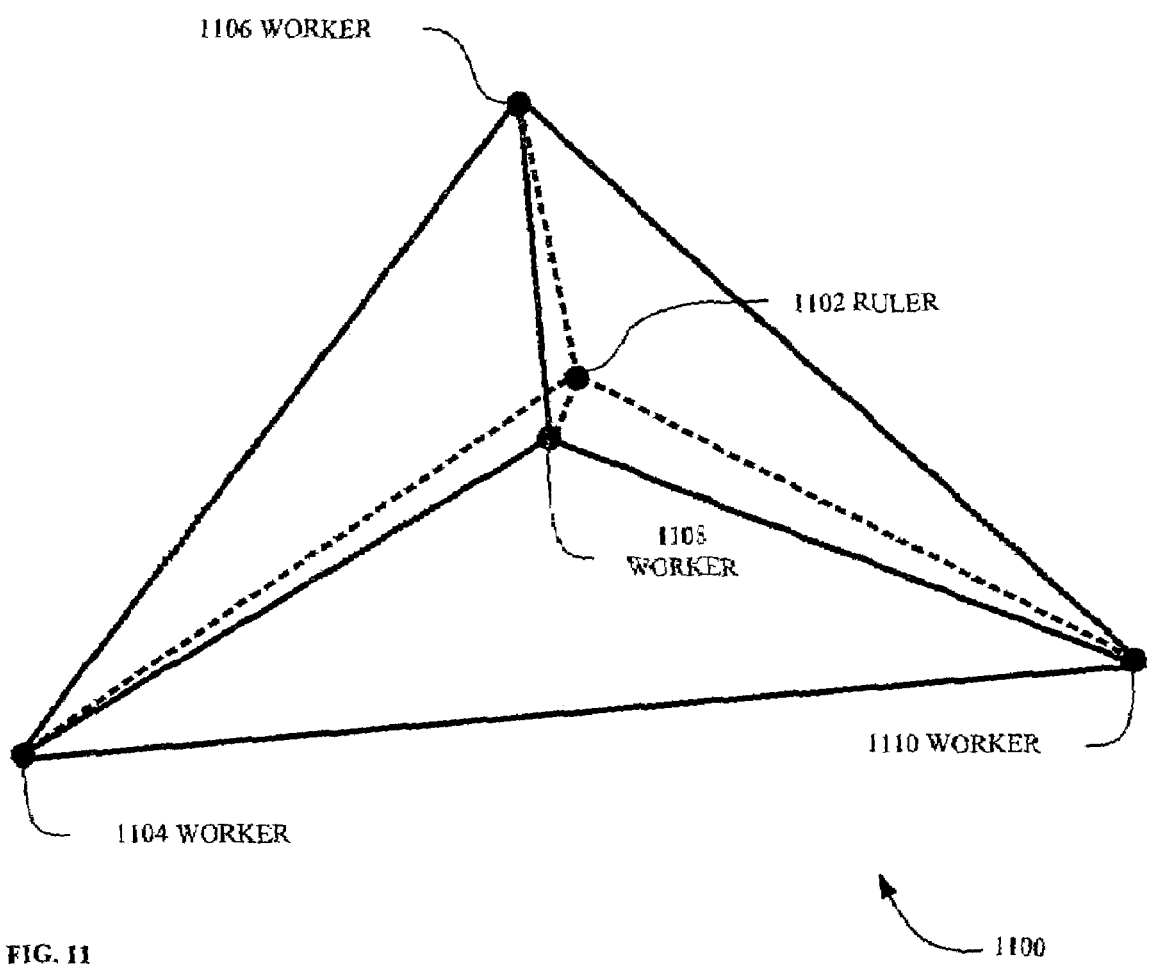
FIG. 11 is a diagram of a three dimensional hierarchical evolvable synthetic neural system, according to an embodiment.

Implementation of an Evolvable Synthetic Neural System in a Tetrahedral Architecture Referring to FIG. 11, a particular three-dimensional implementation is described in conjunction with the system overview in FIG. 1 and the apparatus described in FIG. 6.

FIG. 11 is a diagram of a three dimensional (3D) hierarchical evolvable synthetic neural system (ESNS) 1100, according to an embodiment.

The 3D hierarchical ESNS 1100 may include a ruler subsystem 1102 and four worker subsystems 1104, 1106, 1108 and 1110, as illustrated. Each subsystem in the 3D hierarchical ESNS 1100 may include one or more ESNS such as system 100 or ESNS 600.

The three dimensional architecture of 3D hierarchical ESNS 1100 provides a three dimensional complexity. An implementation of ESNS 600 on a microprocessor such as microprocessor 904, described below with reference to FIG. 9, may provide a synthetic neural system that reconciles the two dimensional nature of microprocessor technologies to the three dimensional nature of biological neural systems.

Implementation of Single Instrument Spacecraft to Prospect Asteroid Belts

Figure 12:
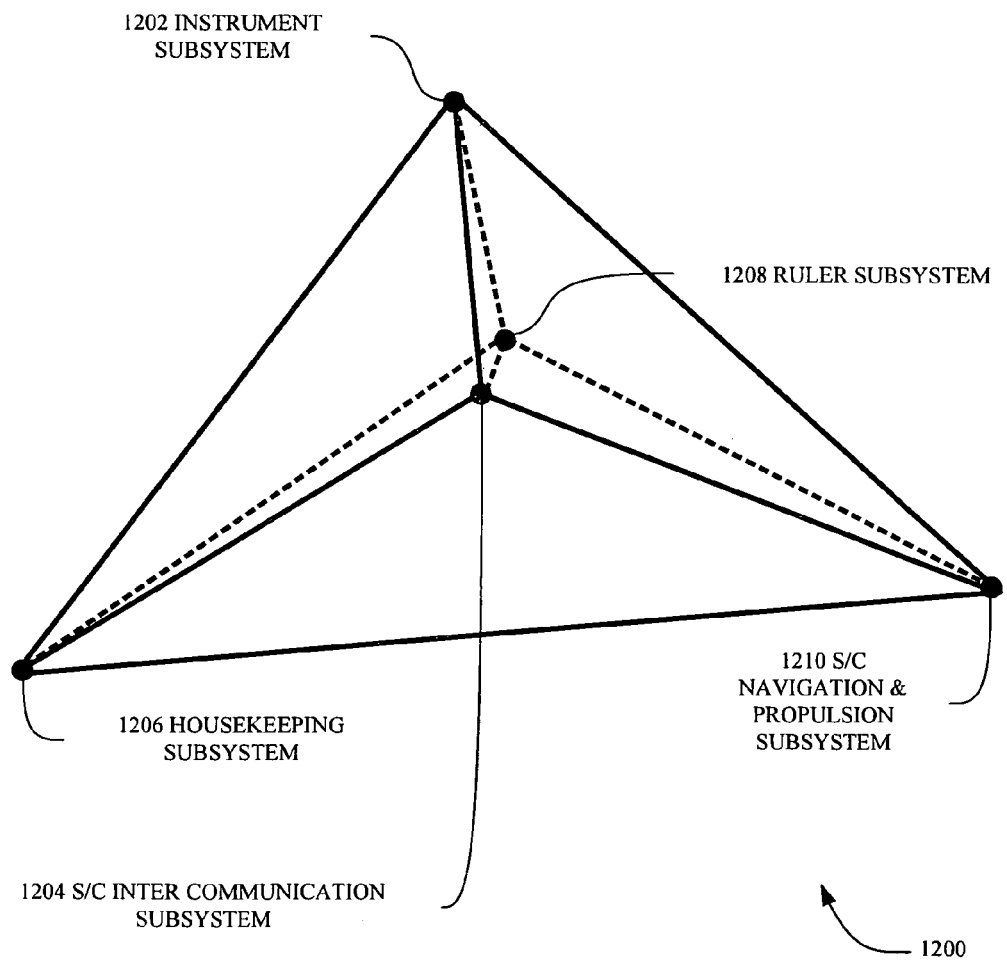
FIG. 12 is a diagram of a heuristic neural system, according to an embodiment, for a single instrument spacecraft to prospect asteroid belts.

Referring to FIG. 12, a particular three-dimensional implementation for asteroid prospecting is described in conjunction with the system overview in FIG. 1 and the apparatus described in FIG. 6.

FIG. 12 is a diagram of a heuristic neural system (HNS) 1200, according to an embodiment, for a single instrument spacecraft to prospect asteroid belts.

Each spacecraft may be controlled by a subset of NBFs (SNBF) which in aggregate provides the behavior of a subsystem of the mission. For example, a solar sail instrument SNBF 1202 may control sail deployment and subsequent configuration activity much as terrestrial sailors perform navigation and manage propulsion. A spacecraft inter communication subsystem SNBF 1204 may control communication with other workers and rulers. Also, a housekeeping SNBF 1206 may control the spacecraft housekeeping. HNS 1200 may also include a ruler subsystem 1208 to coordinate all activities. Similarly, a spacecraft navigation and propulsion subsystem 1210 may control the navigation and propulsion, matching the navigation and propulsion to the current objectives.

Each spacecraft may be a worker in a totally autonomous space mission. The space mission may be configured as an autonomous nanotechnology swarm (ANTS). In this case, each spacecraft in an ANTS may have a specialized mission, much like ants in an ant colony have a specialized mission. Yet, the HNS architecture of each worker in an ANTS may provide coordination and interaction between each HNS that yields performance of the aggregate of the ANTS that exceeds the performance of a group of generalist workers.

More specifically, the SNBFs within HNS 1200 may have a hierarchical interaction among themselves, much as the workers do in the entire ANTS collective. Hence, although many activities of the spacecraft might be controlled by individual SNBFs, a ruler SNBF may coordinate all of the SNBFs to assure that spacecraft objectives are met. Additionally, to have redundancy for the mission, inactive workers and rulers may only participate if a member of their type is lost. In addition, a hierarchical worker node may collapse to a non-hierarchical one, if all of the available subrulers for that node are lost.

In one particular application of an ANTS, a prospecting asteroid mission (PAM) may survey a large population or surface area targets, such as main belt asteroids. The primary objective of a PAM is typically exploration of the asteroid belt in search of resources and material with astrobiologically relevant origins and signatures. The PAM may include a swarm of approximately 1000 spacecraft that may include approximately 10 types of specialist workers (e.g. HNS 1200) with a common spacecraft bus that is organized into 10 sub-swarms of approximately 100 spacecraft each, having approximately 10 specialist HNSs.

In some embodiments, each individual spacecraft in a PAM may weigh 1 kilogram or less with a one meter diameter body and 100 meter$^2$ solar sails when fully deployed. Each spacecraft may be packaged into a 10 cm$^2$ sided cube. Thus, a swarm of 1000 of these spacecraft may fit into 1 meter$^3$ weighing 1000 kilograms in deployment. Each spacecraft may also include a solar sail propulsion system that requires no expendable supplies and a small nuclear battery that provides sufficient power to each worker. Thus, the prospecting asteroid mission may be self-directed and may possibly be self-sustaining for tens of years.

CONCLUSION

An evolvable synthetic neural system (ENS) is described. In some embodiments, the ESNS provides a hierarchical approach to the collective interactions of a number of specialized workers who, as an ensemble, accomplish defined goals and objectives while reducing the dynamic range of behaviors required for a given worker. Furthermore, in some embodiments, each type of worker includes a bi-level intelligence: (1) a high level neural system designed to direct the accomplishment of objective related tasks, and (2) an autonomous neural system which functions to enable required motor activities and related functions much as in biological systems. In some embodiments, an ESNS integrates neural functions at both high and low levels and adapts to conditions brought about by changing success criteria for goals and objectives or by degradation of associated systems. In some embodiments, behavior patterns of varying complexity are achieved by using sets of evolvable synthetic neural systems as neural basis functions that are interconnected and are operated in a hierarchical manner. In some embodiments, in which the neural basis functions (NBFs) are two dimensional, a complete hierarchical neural system of a worker composed of sets of NBFs is executed as a three dimensional simulation of a neural system in a two dimensional chip-based processor array for workers with systems composed of more than three subsystems.

In some embodiments, a hierarchical ESNS has self similarity in that any node of the ESNS is composed of a subset of NBFs which in turn possess a sub-ruler NBF which is the point of contact with other nodes and coordinates the activities of other NBF within that node. In some embodiments, a node may lack neural self similarity. In that case, worker NBFs within a node communicate directly with all other nodes including the ruler NBF and function without any sub-ruler NBF coordination.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all environments and alternate technologies which provide the same functionality as described herein.

We claim:

1. A computer-accessible medium having executable instructions for managing a self-similar neural system based on its functioning status and operating state, the computer-accessible medium comprising:
    computer executable self-similar neural code to generate one or more stay-alive signals based on the functioning status and operating state of the system, by a processor, the stay-alive signals including one or more withdrawing of a stay-alive signal, initiate a self-destruct sequence, or continue to stay alive, at least one stay-alive signal being based on one or more received signals from the system, the received signals being indicative of the functioning status and operating state to obtain an analysis of the condition of the system, the processor processing the one or more received signals and thereby managing operations and resources of the system.

2. The method of claim 1, wherein the functioning status of the system is one or more on signal, off signal, active signal, or inactive signal.

3. The method of claim 1, wherein the operating state of the system is one or more urgency signal, reflex signal, environmental condition, or event condition.

4. The method of claim 3, wherein an event condition is one or more incorrect operation, emergent behavior, failure to perform self healing, or likelihood of jeopardizing primary objectives.

* * * * *